United States Patent
Kishimoto et al.

(10) Patent No.: US 6,714,493 B1
(45) Date of Patent: Mar. 30, 2004

(54) OPTICAL DISK APPARATUS

(75) Inventors: Takashi Kishimoto, Ikoma (JP);
Takeharu Yamamoto, Takatsuki (JP);
Kenji Fujiune, Neyagawa (JP);
Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 218 days.

(21) Appl. No.: 09/696,843

(22) Filed: Oct. 26, 2000

(30) Foreign Application Priority Data

Oct. 27, 1999 (JP) .............................. 11-305030

(51) Int. Cl.⁷ ................................................ G11B 7/00
(52) U.S. Cl. ................................ 369/44.38; 369/53.14; 369/44.75
(58) Field of Search ........................... 369/53.2, 44.25, 369/44.26, 53.14, 53.12, 44.38, 53.15, 53.23

(56) References Cited

U.S. PATENT DOCUMENTS 6,314,065 B1 * 7/1996 Akkermans ............... 369/44.25
5,963,517 A     10/1999 Nakagaki et al.
6,466,531 B1 * 10/2002 Lee ............................ 369/53.2

FOREIGN PATENT DOCUMENTS

| JO | 05028519 A | 2/1993 | | |
|---|---|---|---|---|
| JP | 63214923 A | 9/1988 | | |
| JP | 2-278521 | 11/1990 | | |
| JP | 5-168140 | 7/1993 | | |
| JP | 7-153209 | 6/1995 | | |
| JP | 8-265960 | 10/1996 | | |
| JP | 10-55550 | * | 2/1998 | .............. 369/44.25 |

* cited by examiner

Primary Examiner—Nabil Hindi
(74) Attorney, Agent, or Firm—Akin, Gump, Strauss, Hauer & Feld, L.L.P.

(57) ABSTRACT

An optical disk apparatus of the present invention includes: a light irradiator operable to converge a light beam and to irradiate an information carrier (a recording medium) with the converged light beam; a moving means operable to move a converging point of the light beam in a direction substantially perpendicular to a surface of the information carrier; and a focusing controller operable to control the moving means to place the converging point of the light beam at a predetermined position. The focusing controller includes: a converging state detector operable to generate a detection signal corresponding to a converging state of the light beam on the information carrier; a focusing driving means operable to generate a driving signal for driving the moving means based on the detection signal; an integrator operable to integrate a magnitude of a signal corresponding to the driving signal over a predetermined time period; and an abnormal state detector operable to detect an abnormal state of the moving means based on an output of the integrator.

14 Claims, 15 Drawing Sheets

$T_0 \sim T_1$ : PERIOD OF A ROTATION OF THE OPTICAL DISK

OPTICAL DISK APPARATUS

BACKGROUND OF THE INVENTION

The present invention relates generally to an optical disk apparatus for writing information to an information carrier (a recording medium) or reproducing information recorded on the information carrier by using a light beam from a light source, like a laser, more particularly, the present invention relates to an optical disk apparatus that can detect an abnormal state of an actuator when a focusing control or a tracking control is performed.

Now optical disk apparatuses that can record/reproduce information to/from an optical disk (information carrier or recording medium) having a recording layer formed of a phase-change medium or a magneto-optical medium have come into practical use. Such an optical disk apparatus irradiates a recording surface of the optical disk with a light beam converged by a converging lens (an objective lens) included therein so as to cause a phase change or inversion of magnetic polarization in the recording layer, thereby the information can be recorded onto the optical disk. As for the reproduction, the optical disk apparatus can reproduce the information from the optical disk by detecting reflected light from the optical disk.

In the recording/reproduction operation mentioned above, the light beam is to be subjected to a focusing control in order to accurately place a converging point of the light beam on the recording surface of the optical disk. The focusing control is realized by moving the converging lens in a direction substantially perpendicular to the surface of the optical disk so as to move a focus of the light beam in a thickness direction of the optical disk. In the focusing control, a focusing actuator that is composed of a voice coil motor, for example, is used for moving the converging lens. Once the focus of the light beam is positioned on the recording surface of the optical disk, the focusing actuator controls the movement of the converging lens to keep a distance between the recording surface and the converging lens substantially constant (this corresponds to a state where a focusing servo is performed).

In the focusing control, a relatively large driving current may be applied to the focusing actuator continuously because of a breakdown of a circuit included in a focusing servo system or the like. When such a large driving current continuously flows through the focusing actuator over a time period longer than a predetermined time period, a power supplied to the focusing actuator may exceed the maximum rating power thereof, causing overheating of the focusing actuator. This overheating may cause the focusing actuator to be damaged.

As a method for protecting the actuator from being damaged, there is a known method in which the driving of the focusing actuator is stopped when the driving current for the actuator exceeds a predetermined current value (Japanese Patent Publication No. 6-64745, for example). In accordance with the method, it is possible to determine that the focusing actuator is driven abnormally in a case where the current having the magnitude exceeding a predetermined magnitude is continuously applied to the focusing actuator, as shown in FIG. 1A, when the optical disk apparatus begins the operation or the focusing servo is performed. Thus, the damage of the actuator can be prevented.

Moreover, when the focusing servo is performed, a transient disturbance may occur because of a partial waver caused by a local undulation or unevenness of the recording surface of the optical disk generated in a fabrication process of the optical disk, a vibration applied to the optical disk apparatus or the like. In a case where the focusing actuator is driven in order to suppress the aforementioned external disturbance, a driving current shown in FIG. 1B, for example, flows through the focusing actuator. By supplying such a driving current to the focusing actuator, it is possible to make the movement of the converging lens follow the waver of the optical disk, thus maintaining the appropriate focusing state.

However, according to the aforementioned conventional method for protecting the actuator, when the driving current shown in FIG. 1B is supplied to the focusing actuator, it is determined that the driving of the focusing actuator is in the abnormal state at a time at which the current value exceeds the predetermined current value even if the power does not exceed the maximum rating power expressed as the product of a predetermined time period (rating time) and a predetermined current value (rating current), so that the driving of the focusing actuator is stopped. This prevents the supply of the driving current having a necessary magnitude to the focusing actuator, resulting in a failure of the focusing servo.

On the other hand, as a method of protecting the actuator, there is another known method in which the driving current for the focusing actuator is integrated by using a predetermined time constant and the driving of the focusing actuator is stopped when the integration result (that is, the power) exceeds a predetermined value (Japanese Patent No. 2864799, for example). In accordance with this method, it is not determined that the driving of the focusing actuator is in the abnormal state when the driving current shown in FIG. 1B flows through the focusing actuator. Thus, it is possible to continue the focusing servo.

The latter protection method utilizes an integration technique (a signed value integration) in which an output of an integrator is always approximately zero in a case where the driving current goes between a plus side (charging) and a minus side (discharging). This is because this method takes a case of suppressing the disturbance in one direction (a direction in which the converging lens becomes closer to the optical disk or a direction opposite thereto) occurring at a period substantially the. same as the rotation period of the optical disk into consideration. In this case, in order to protect the actuator, it is sufficient that the integration result of the current value when the driving current corresponding to such a flash or transient unidirectional disturbance flows through the actuator is obtained. During a period in which no transient disturbance occurs (when the normal servo is performed), the driving current fluctuates between the positive and the negative while having the smaller amplitude. It is preferable according to this conventional protection method that the driving current when the normal servo is performed is not contained in the current integration value used for determining whether or not the condition for protecting the actuator is satisfied.

In recent years, the rotation speed of the optical disk in the optical disk apparatus has been largely increased. However, this causes a problem of occurrence of an external disturbance having a high frequency. It is known that the waver caused when the optical disk rotates contains not only a waver occurring in synchronization with one rotation of the optical disk (a primary component) but also a component N times the primary component (a higher degree component). In a case of rotating the optical disk at 160 Hz to 180 Hz, for example, the primary waver having the frequency of 160 Hz to 180 Hz and a high frequency component (the high-frequency disturbance) having 2 kHz to 3 kHz may be generated. Such a high-frequency disturbance largely influences the focusing servo.

Herein, the influences of the high-frequency disturbance on the focusing servo are described.

FIG. 2 shows loop characteristics of the focusing servo system in the conventional optical disk apparatus. The waver having a lower frequency and a large amplitude, such as the primary component of the waver, is generated in a lower-frequency region (100 Hz or less, for example). Thus, as shown with Line A in FIG. 2, it is necessary to set the loop gain in the lower-frequency region to be a large value so as to improve the ability of following the waver of the optical disk. This enables the focusing actuator to be driven in such a manner that a deviation of the focus from the recording surface is equal to or less than a predetermined level, thereby the focusing control can be performed appropriately. On the other hand, the loop gain is set to be a small value in a higher-frequency region (1 kHz or more, for example). This is because the amplitude of the high-frequency disturbance is small (for example, within a range where a signal can be read from the optical disk) and therefore there is no problem even if the gain of the servo is made small.

When the optical disk is rotated at a higher speed, however, the external disturbance having the quite high frequency is generated. The spectrum of such disturbance is shown in FIG. 2. As the amplitude of such a high-frequency component becomes larger, there arises a necessity of making the loop gain of the focusing servo system relatively larger. Therefore, in the case of rotating the optical disk at the higher speed, the high-frequency disturbance having the large amplitude is suppressed by making the gain (loop gain) of the servo larger, as shown with Line B in FIG. 2, to improve the following ability. Otherwise, the appropriate focusing servo state cannot be maintained because of the high-frequency component of the disturbance, preventing the continuous reproduction/recording operation.

In the case of the larger loop gain, however, the power consumption of the focusing actuator also becomes large. To the focusing actuator, the driving current containing the high-frequency component having the large amplitude, for example, as shown in FIG. 1C, is supplied in order to follow the high-frequency disturbance. Such a current component fluctuates between the plus side and the minus side as the driving current for suppressing the primary waver of the optical disk fluctuates. The current component is always applied to the focusing actuator when the focus servo is performed. This means that a substantially constant additional power is supplied to the focusing actuator.

Therefore, when the optical disk is rotated at the higher speed, the large driving current containing a high-frequency AC component is applied to the focusing actuator, thus the focusing actuator may continue to be driven abnormally. The adverse effect of the AC component contained in the driving current on the focusing actuator becomes larger as the rotation speed of the optical disk increases. The higher-frequency AC component of the driving current increases the power supplied to the focusing actuator.

On the other hand, according to the latter one of the conventional protection methods mentioned above, the AC component of the driving current fluctuating between the plus side and the minus side that is generated when the focusing servo is performed for the optical disk rotating at the higher speed cannot be detected. Thus, it is impossible to determine whether or not the abnormal driving of the focusing actuator occurs. Such a problem does not arise when the optical disk is rotated at a relatively low speed.

Moreover, the conventional optical disk apparatus protects the actuator by stopping the driving of the focusing actuator when detecting the abnormal driving of the focusing actuator. Thus, there is a problem that information recorded on a portion where the abnormal driving is detected cannot be reproduced.

Furthermore, the conventional optical disk apparatus does not have a protection function for a tracking actuator. Therefore, it is impossible to detect an AC component of a large driving current applied to the tracking actuator when the reproduction/recording operation is performed for the optical disk eccentrically rotating at the higher speed, as in the case of the focusing actuator. Accordingly, the abnormal driving of the tracking actuator cannot be detected. The protection of the tracking actuator is also important when the optical disk is rotated at the higher speed.

SUMMARY OF THE INVENTION

The invention provides an optical disk apparatus that can stably perform the reproduction/recording operation for the optical disk while protecting the focusing/tracking actuator appropriately.

An inventive optical disk apparatus includes: a light irradiator operable to converge a light beam and irradiate an information carrier with the converged light beam; a moving means operable to move a converging point of the light beam in a direction substantially perpendicular to a surface of the information carrier; and a focusing controller operable to control the moving means to place the converging point of the light beam at a predetermined position. The focusing controller includes: a converging state detector operable to generate a detection signal corresponding to a converging state of the light beam on the information carrier; a focusing driving means operable to generate a driving signal for driving the moving means based on the detection signal; an integrator operable to integrate a magnitude of a signal corresponding to the driving signal over a predetermined time period; and an abnormal state detector operable to detect an abnormal state of the moving means based on an output of the integrator.

Another inventive optical disk apparatus includes: a light irradiator operable to converge a light beam and irradiate an information carrier with the converged light beam; a moving means operable to move a converging point of the light beam in a direction substantially perpendicular to a surface of the information carrier; and a focusing controller operable to control the moving means to place the converging point of the light beam at a predetermined position. The focusing controller includes: a converging state detector operable to generate a detection signal corresponding to a converging state of the light beam on the information carrier; a focusing driving means operable to generate a driving signal for driving the moving means based on the detection signal; an integrator operable to integrate a magnitude of a signal corresponding to the detection signal over a predetermined time period; and an abnormal state detector operable to detect an abnormal state of the moving means based on an output of the integrator.

In one embodiment of the present invention, the driving signal is decreased to prevent the moving means from being damaged when the abnormal state detector detects the abnormal state of the moving means.

In another embodiment of the present invention, a loop gain of the focusing controller is decreased when the abnormal state detector detects the abnormal state of the moving means.

In still another embodiment of the present invention, a rotation speed of the information carrier is lowered when the abnormal state detector detects the abnormal state of the moving means.

In yet another embodiment of the present invention, the optical disk apparatus further includes: a second moving means operable to move the light beam in a direction traversing a track formed on the surface of the information carrier; a deviation detector operable to generate a signal corresponding to a positional relationship between the light beam and the track; and a tracking controller operable to control the light beam to scan on the track by driving the second moving means in response to the signal generated by the deviation detector. The abnormal state detector changes a detection threshold value used for detection of the abnormal state in accordance with operation modes of the tracking controller.

Still another inventive optical disk apparatus includes: a light irradiator operable to converge a light beam and irradiate an information carrier with the converged light beam; a moving means operable to move the light beam in a direction traversing a track formed on a surface of the information carrier; a tracking controller operable to control the moving means to scan the track with the light beam. The tracking controller includes: a deviation detector operable to generate a detection signal corresponding to a positional relationship between the light beam on the information carrier and the track; a tracking driving means operable to generate a driving signal for driving the moving means based on the detection signal; an integrator operable to integrate a magnitude of a signal corresponding to the driving signal over a predetermined time period; and an abnormal state detector operable to detect an abnormal state of the moving means based on an output of the integrator.

Yet another inventive optical disk apparatus includes: a light irradiator operable to converge a light beam and irradiate an information carrier with the converged light beam; a moving means operable to move the light beam in a direction traversing a track formed on a surface of the information carrier; a tracking controller operable to control the moving means to scan the track with the light beam. The tracking controller includes: a deviation detector operable to generate a detection signal corresponding to a positional relationship between the light beam on the information carrier and the track; a tracking driving means operable to generate a driving signal for driving the moving means based on the detection signal; an integrator operable to integrate a magnitude of a signal corresponding to the detection signal over a predetermined time period; and an abnormal state detector operable to detect an abnormal state of the moving means based on an output of the integrator.

In one embodiment of the present invention, the driving signal is decreased to prevent the moving means from being damaged when the abnormal state detector detects the abnormal state of the moving means.

In another embodiment of the present invention, a loop gain of the tracking controller is decreased when the abnormal state detector detects the abnormal state of the moving means.

In still another embodiment of the present invention, a rotation speed of the information carrier is lowered when the abnormal state detector detects the abnormal state of the moving means.

Yet another inventive optical disk apparatus includes: a light irradiator operable to converge a light beam and irradiate an information carrier with the converged light beam; and a moving means operable to move a converging point of the light beam in a direction substantially perpendicular to a surface of the information carrier. The magnitude of a focusing control signal is integrated over a predetermined time period, the focusing control signal being used for controlling a movement of the moving means to place the converging point of the light beam at a predetermined position. A driving signal for driving the moving means is adjusted based on a result of the integration.

Yet another inventive optical disk apparatus includes: a light irradiator operable to converge a light beam and irradiate an information carrier with the converged light beam; and a moving means operable to move the light beam in a direction traversing a track formed on a surface of the information carrier. The magnitude of a tracking control signal is integrated over a predetermined time period, the tracking control signal being used for controlling a movement of the moving means to allow the light beam and the track to have a predetermined positional relationship. A driving signal for driving the moving means is adjusted based on a result of the integration.

BRIEF DESCRIPTION OF THE SEVERAL VIEWS OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1A shows a case where a continuous disturbance occurs; FIG. 1B shows a case where a flash or transient disturbance occurs; and FIG. 1C shows a case where a high frequency component of the disturbance occurs;

FIG. 6A illustrates a case of lowering a rotation speed of an optical disk; FIG. 6B illustrates a case of lowering a loop gain of a focusing control system;

FIG. 10A illustrates a case of lowering the rotation speed of the optical disk; FIG. 10B illustrates a case of lowering a loop gain of a tracking control system;

FIG. 14A illustrates a case of lowering the rotation speed of the optical disk; FIG. 14B illustrates a case of lowering the loop gain of the focusing/tracking control system;

DETAILED DESCRIPTION OF THE INVENTION

Hereinafter, preferred embodiments of the inventive optical disk apparatus will be described with reference to the accompanying drawings.

Embodiment 1

Figure 3:
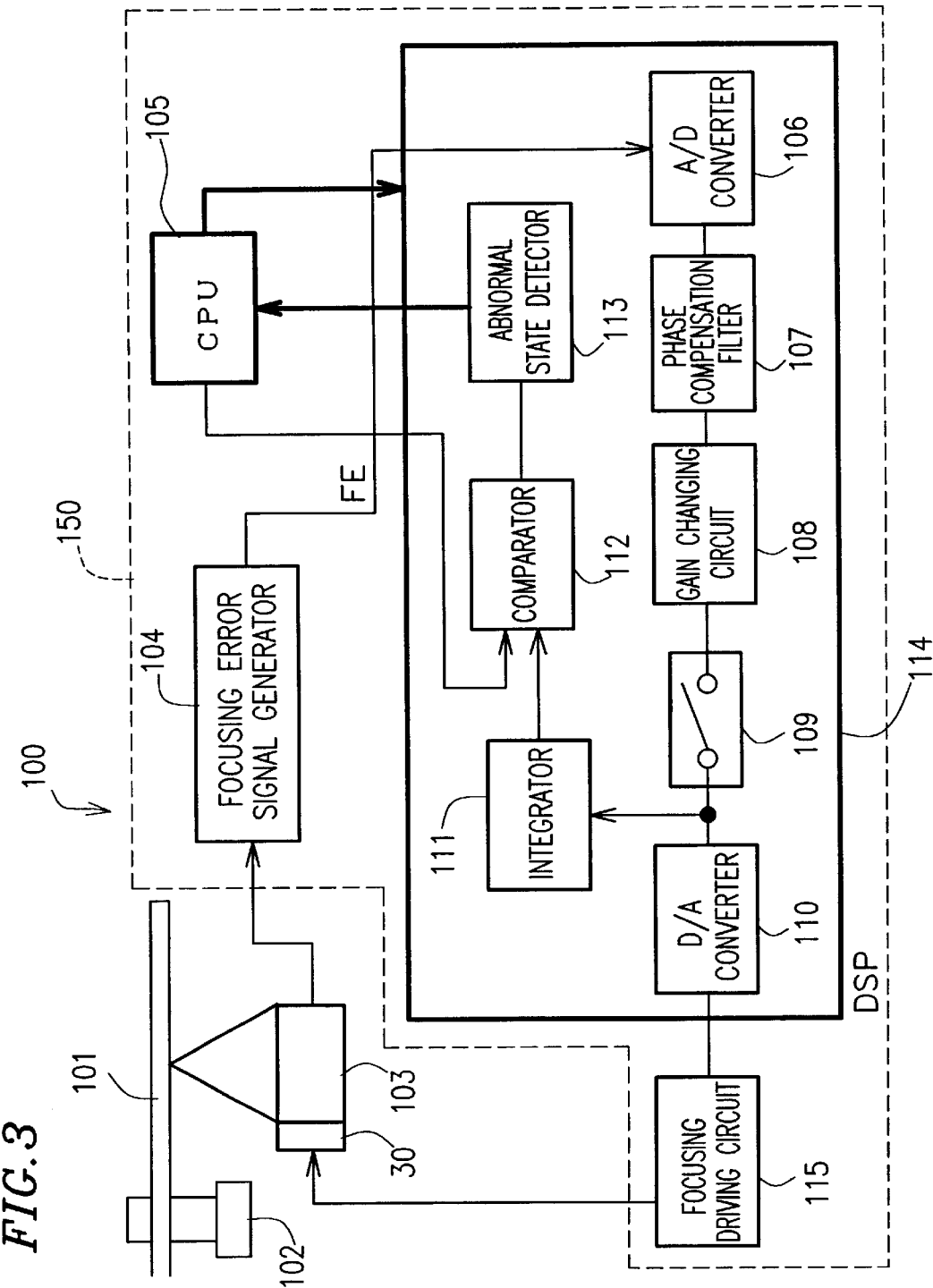
FIG. 3 is a block diagram illustrating a structure of an optical disk apparatus according to the first embodiment of the present invention.

FIG. 3 is a block diagram schematically showing the structure of the optical disk apparatus according to the first embodiment of the present invention.

The optical disk apparatus 100 of the present embodiment includes a disk motor 102 for rotating an optical disk 101 at a predetermined rotation speed: an optical head 103 for reproducing information from the optical disk 101 or recording information onto the optical disk 101; a focusing actuator 30 for moving a converging point of a light beam radiated by the optical head 103 to the optical disk 101 in a thickness direction of the optical disk 101 (i.e., a direction substantially perpendicular to a disk surface); and a focusing controller 150 for controlling the focusing actuator 30 to perform a focusing operation. In addition, the optical disk apparatus 100 includes a traverse motor (not shown) for moving the optical head 103 in a direction substantially perpendicular to a track direction provided on the optical disk 101 (i.e., a radial direction of the optical disk 101).

Figure 4:
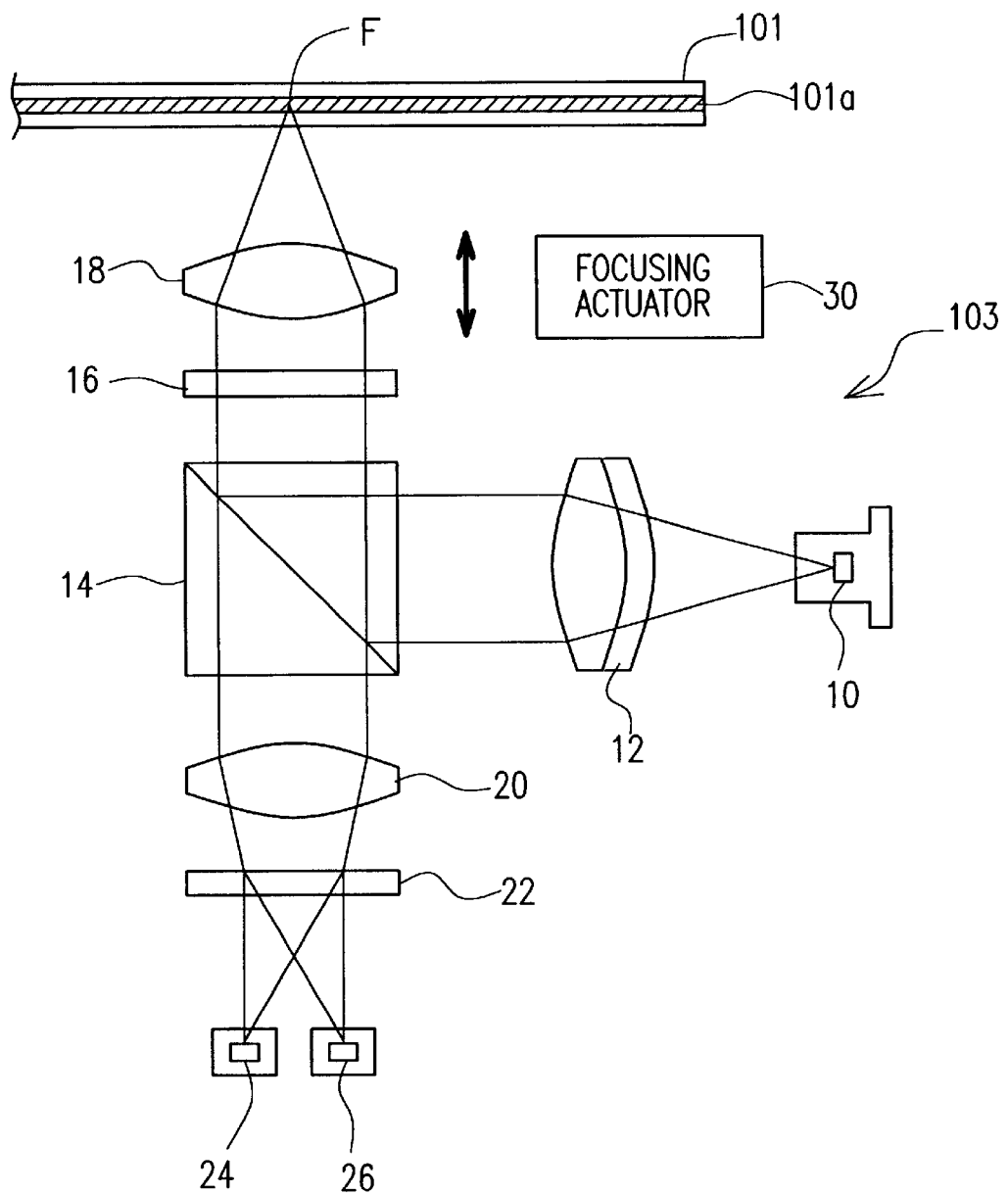
FIG. 4 is a diagram schematically showing an exemplary configuration for an optical head included in the optical disk apparatus of the present invention.

With reference to FIG. 4, the optical head 103 is described. The optical head 103 includes a light source 10, such as a semiconductor laser; a coupling leans 12; a polarized beam splitter 14: a polarizer 16; a converging lens (an objective lens) 18; a condense lens 20; a splitting mirror 22; a photodetector 24 for focusing error detection; and a photodetector 26 for tracking error detection. The focusing actuator 30 associated with the optical head 103 is constituted by a voice coil motor including a magnet fixed to the converging lens and a driving coil provided near the magnet, for example. The focusing actuator 30 can move the converging lens 18 in the direction substantially perpendicular to the disk surface with high accuracy.

In the optical head 103, the light beam emitted from the light source 10 is changed to parallel rays by the coupling lens 12, reflected by the polarized beam splitter 14 and then passes through the polarizer 16 so as to be converged by the converging lens 18. The converged light beam is radiated to the optical disk 101 to form a focus (converging point) F on a recording layer 101a of the optical disk 101. Actually, the converging point F is a beam spot having a finite diameter and a predetermined focal depth. An appropriate converging state is realized when the recording layer 101a of the optical disk 101 is positioned at such a beam spot.

The light reflected from the optical disk 101 passes through the converging lens 18, the polarizer 16, the polarized beam splitter 14 and the condense lens 20 in that order, and is then divided by the splitting mirror 22 into light beams towards two directions. One of the light beams is input to the focusing controller 150 (see FIG. 3) via the photodetector 24 for the focusing error detection (a two-divided photodetector in this embodiment), while the other light beam is input to a tracking controller described later via the photodetector 26 for the tracking error detection (a four-divided photodetector in this embodiment).

It should be noted that the structure of the optical head 103 is not limited to the above. The optical head 103 may include an optical system (a light irradiator) having various configurations that can converge the light beam and illuminate the optical disk with the converged light beam. For example, instead of using the beam splitter, a hologram element having a diffraction grating may be used to generate an error signal. Moreover, the optical system may be integrated to be a single component by forming an element having a similar function to that of the objective lens, a photodiode and the like on a substrate having an optical guide layer by semiconductor processes. In addition, the focusing actuator may have various configurations in accordance with the configuration of the optical head or the like, as long as the focusing actuator can move the converging point of the light beam in the direction substantially perpendicular to the recording surface of the optical disk.

Returning to FIG. 3, the focusing controller 150 includes a focusing error signal generator 104, a digital signal processor (hereinafter, simply referred to as a DSP) 114 and a focusing driving circuit 115.

In the focusing error signal generator 104, signals output from the two-divided photodetector 24 are input to a differential amplifier that outputs to the DSP 114 a signal indicating a deviation of the converging point of the light beam from the optical disk 101, i.e., a focusing error signal (hereinafter, referred to as an FE signal). Such a detection method of the FE signal is called as "SSD method". Please note that the FE signal can be detected by another detection method, such as "Knife-edge method."

The FE signal input to the DSP 114, that is an analog signal, is converted into a digital signal by an A/D converter 106. The digital signal from the A/D converter 106 is input to a phase compensation filter 107 for compensating a phase of a focusing control system. The phase compensation filter 107 is a digital filter constituted by an adder, a multiplier and a delay circuit. A focusing control signal having a phase compensated by the phase compensation filer 107 is input to a gain changing circuit 108 for changing a loop gain of the focusing control system. It should be noted that the term "focusing control signal" as used herein means various signals used for the focusing control that contain information related to the focusing error. Thus, the "focusing control signal" may be analog or digital, includes the FE signal, the digital signal processed in the DSP and a focusing actuator driving signal (described later). The signal output from the gain changing circuit 108 is then input to a switch 109 that switches the opening/closing of the loop of the focusing control system. The switch 109 is turned on when the focusing control (the focusing servo) is performed.

The focusing control signal that passed through the switch 109 is converted from the digital signal to an analog signal by a D/A converter 110 and is then input to a focusing driving circuit 115. The focusing control signal input to the focusing driving circuit 115 is subjected to an appropriate current amplification and an appropriate level adjustment, so that the focusing actuator driving signal is generated. Therefore, the focusing driving circuit 115 drives the focusing actuator 30. Thus, the focusing actuator 30 is driven in such a manner that the light beam on the optical disk 101 always in a predetermined converging state, thereby the focusing control is performed.

In the DSP 114, the focusing control signal that passed through the switch 109 is also input to an integrator 111. The integrator 111 integrates a magnitude of the focusing control signal input thereto over a predetermined time period and outputs the integration result to a comparator 112. The comparator 112 compares the integration result from the integrator 111 with an abnormal state detection level (Fdlvl) determined by the CPU 105. When the integration result exceeds the abnormal state detection level (Fdlvl), it is determined that the focusing actuator is in an abnormal driving state. In this case, a signal indicating that the focusing actuator is abnormally driven is sent from an abnormal state detector 113 to the CPU 105. Actually, these processes are performed in accordance with a program stored in the optical disk apparatus.

Figure 5:
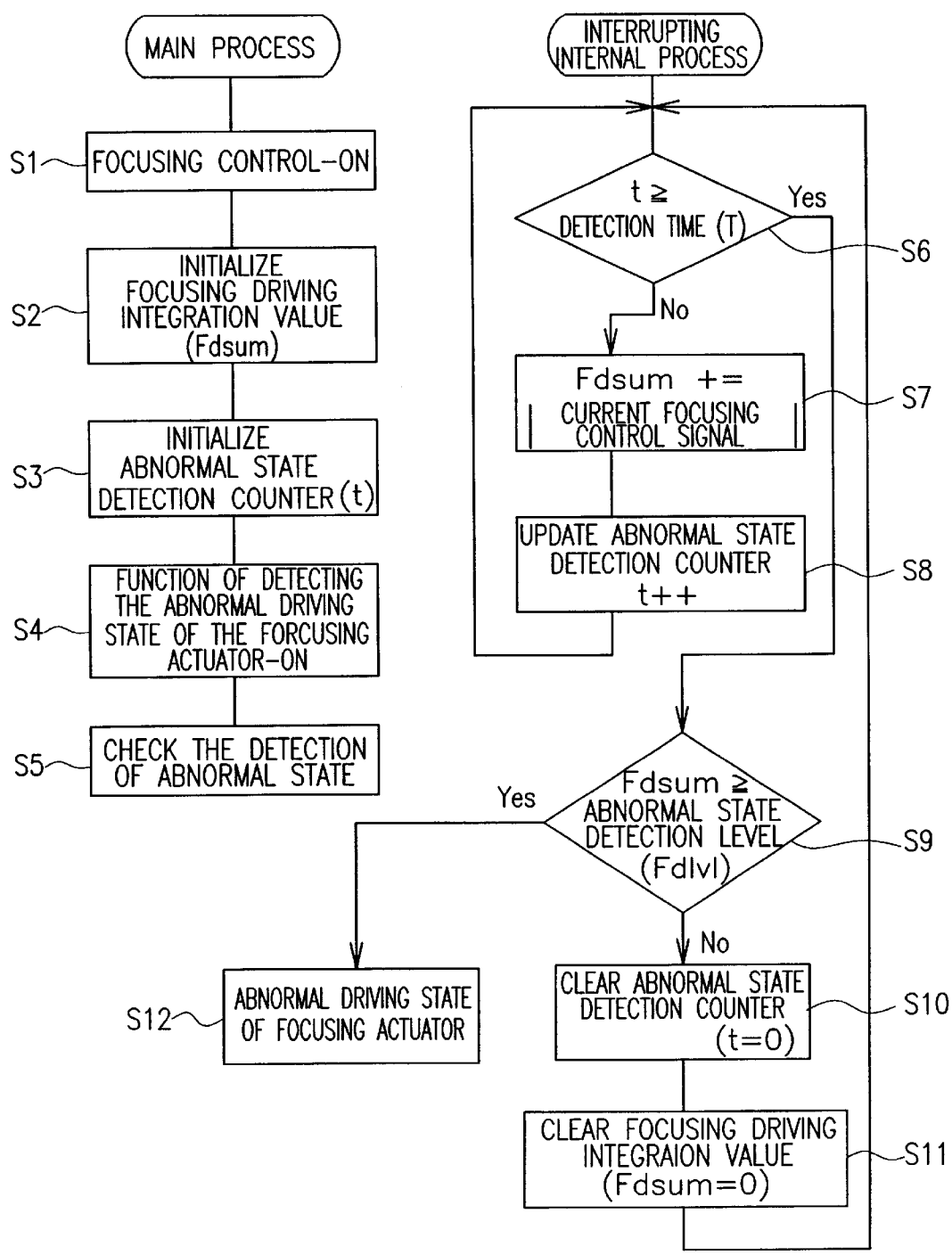
FIG. 5 is a flowchart illustrating an abnormal driving state detection process for focusing actuator in the first embodiment.

Next, a process of detecting the abnormal driving state of the focusing actuator is described referring to the block diagram of FIG. 3 and a flowchart of FIG. 5.

A process executed by software in the DSP 114 is classified into a main process where various types of abnormal states are checked and processes based on commands received from the. CPU 105 are performed and an interrupting internal process in which a control of the disk motor, the focusing control and the tracking control and the like are performed in a constant sampling time period.

In Step S1 of the main process, the switch 109 is closed to start the focusing control so that the light beam on the optical disk 101 is always in a predetermined converging state. In Steps S2 and S3, a focusing driving integration value (Fdsum) nd an abnormal state detection counter (t) in the integrator 111 are initialized. Then, a function of detecting the abnormal driving state of the focusing actuator is turned on in Step S4, thereby starting the integration of the magnitude of the focusing control signal in the integrator 111.

Then, in Step S5, it is checked whether or not the abnormal state is detected. At this time, the main process goes into a state of waiting a next command sent from the CPU 105 where various processes can be performed based on the commands from the CPU 105. On the other hand, the main processes waits for a signal indicative of the abnormal driving state of the focusing actuator from the interrupting internal process. Although the tracking control is started following the above process in the actual optical disk apparatus, the description of the tracking control is omitted.

At the state where the main process is waiting for the command from the CPU 105 in Step S5, the interrupting internal process performs the detection of the abnormal driving the focusing actuator. This detection can be performed anytime in the DSP 114, as well as other abnormal state detections (for example, the detection whether or not the focusing servo can be turned on).

Next, the interrupting internal process is described. The DSP 114 starts the following detection routine in the interrupting internal process, when the function of detecting the abnormal driving state of the focusing actuator is turned on in Step S4 of the main process.

In Step S6, it is determined whether or not the abnormal state detection counter (t) reaches a predetermined detection time (T). In a case where the counter (t) does not reach the predetermined detection time (T), the absolute or unsigned value (i.e., magnitude) of the current focusing control signal for the focusing actuator that has passed through the switch 109 is added to the current focusing driving integration value (Fdsum) in Step S7, thereby the focusing driving integration value (Fdsum) is updated. Moreover, the abnormal state detection counter (t) is increased in Step S8, and then the process goes back to Step S6.

In a case where the abnormal state detection counter (t) reaches the predetermined time (T) in Step S6, the focusing driving integration value (Fdsum) is compared with the abnormal state detection level (Fdlvl) set in the comparator 112 by the CPU 105, in Step S9. When the focusing driving integration value (Fdsum) does not exceed the abnormal state detection level (Fdlvl), the abnormal state detection counter (t) and the focusing driving integration value (Fdsum) are reset to zero in Steps S10 and S11, then returning to Step S6. On the other hand, when the focusing driving integration value (Fdsum) exceeds the abnormal state detection level (Fdlvl), it is determined that the focusing actuator is driven abnormally in Step S12, notifying that to the main process. The main process then notifies the CPU 105 via the abnormal state detector 113 that the focusing actuator is driven abnormally.

The predetermined detection time (T) and the abnormal state detection level (Fdlvl) mentioned above are appropriately set based on, for example, the maximum rated power of the actuator (continuously 1W or less and 2W or less in two seconds, for example). It is preferable that the predetermined detection time (T) is equal to or longer than a period of the rotation of the optical disk and is equal to or shorter than a rating time defining the maximum rating power of the actuator. In a case where the detection time (T) is shorter than the rotation period of the optical disk, there is a possibility that effects of a disturbance which may occur in synchronization with the rotation period of the optical disk is not reflected to the integration result. In this case, the accuracy of the abnormal state detection is lowered. In another case where the detection time (T) exceeds the rating time of the actuator, there is a possibility that the power exceeding the maximum rating power of the actuator may be supplied to the actuator in the abnormal state. Therefore, the detection time (T) exceeding the rating time of the actuator is not appropriate for protecting the actuator.

Figure 6A:
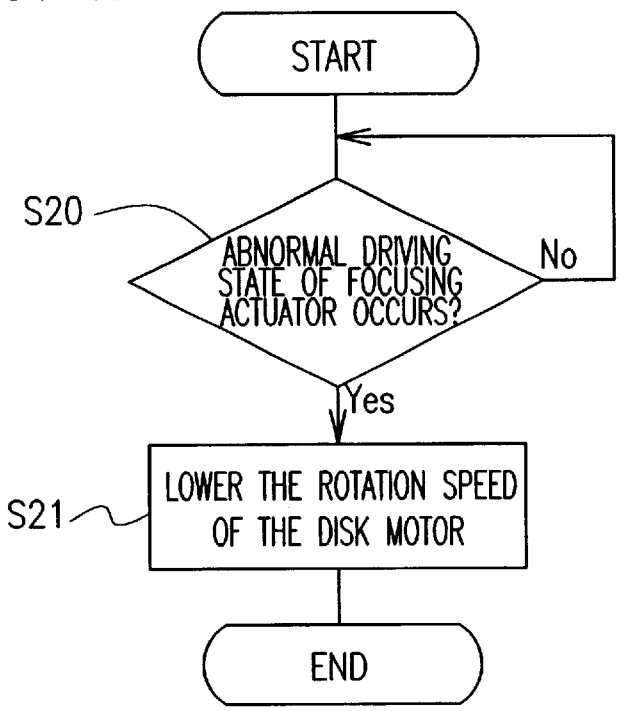
FIGS. 6A and 6B are flowcharts illustrating a process performed when the abnormal state is detected in the first embodiment.
Figure 6B:
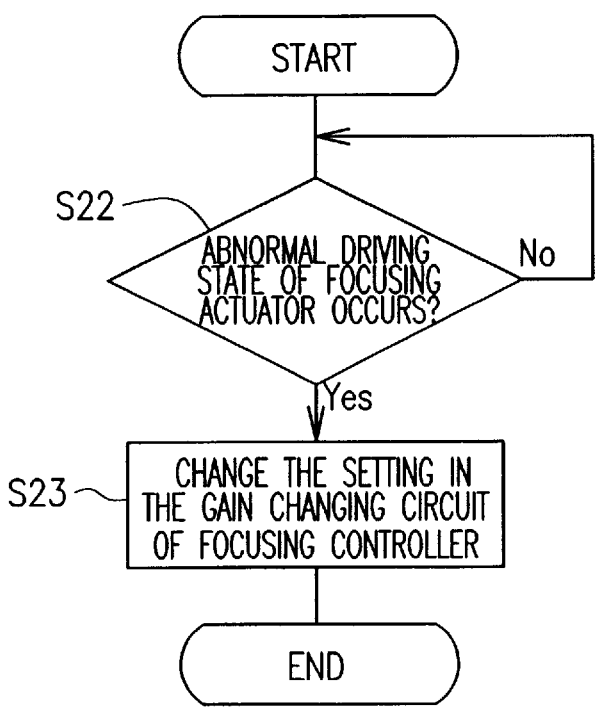

Next, a process following the process of detecting the abnormal driving state of the focusing actuator in the present embodiment is described referring to the block diagram of FIG. 3 and flowcharts of FIGS. 6A and 6B.

FIGS. 6A is a flowchart in a case of protecting the focusing actuator by lowering the rotation speed of the disk motor 102, while FIG. 6B is a flowchart in a case of protecting the focusing actuator by lowering the loop gain of the focusing control system.

First, the case of lowering the rotation speed of the disk motor 102 is described. As shown in FIG. 6A, it is determined whether or not the focusing actuator is driven abnormally in Step S20. When the focusing actuator is driven normally, the process goes back to Step S20. The detection of the abnormal state of the focusing actuator driving is performed by the abnormal state detector 113 in the DSP 114 as described above, and the detection result is notified to the CPU 105 when the abnormal state is detected. The CPU 105 that received the notification from the DSP 114 reduces the rotation speed of the disk motor 102 in Step S21. The magnitude of the power supplied to the focusing actuator in order to track the waver of the surface of the optical disk 101 is in proportion to a square of the rotation speed of the disk motor 102. Thus, when the rotation speed of the disk motor 102 is reduced, it is possible to largely decrease the power supplied to the focusing actuator (that is, to make the magnitude of the focusing actuator driving signal smaller). In this way, the focusing actuator can be appropriately protected by lowering the rotation speed of the disk motor 102 in such a manner that the focusing driving integration value (Fdsum) does not exceed the abnormal state detection level (Fdlvl).

In addition, when the rotation speed of the optical disk is reduced as described above, a frequency of an external disturbance (high degree components of the waver of the disk surface, for example) is also lowered, thus securing the loop gain sufficient for the focusing servo system. Therefore, the focusing servo control is kept in an appropriate state and the reproduction/recording of the optical disk can be performed continuously.

Next, the case of lowering the loop gain of the focusing control system is described. As shown in FIG. 6B, it is determined whether or not the focusing actuator is driven abnormally in Step S22. When the focusing actuator is driven normally, the process goes back to Step S22. When the focusing actuator is driven abnormally, the setting of the gain changing circuit 108 is changed so as to make the loop gain of the focusing control system smaller in such a manner that the focusing driving integration value (Fdsum) does not exceed the abnormal state detection level (Fdlvl) in Step S23. Thus, the power supplied to the actuator is decreased, thereby the actuator can be protected.

Moreover, when both the rotation speed of the optical disk and the loop gain of the focusing control system are lowered, it is possible not only to protect the focusing actuator but also to keep the focusing servo control in the appropriate state effectively. In a case of lowering the rotation speed of the optical disk only, the loop gain remains relatively large although the disturbance having the high frequency is reduced. Therefore, the focusing servo system is in a state having a tracking ability equal to or larger than the necessary tracking ability. Such a state is disadvantageous in reducing a driving current of the actuator. On the other hand, when both the rotation speed of the optical disk and the loop gain are lowered, the power consumption of the actuator can be reduced effectively while the appropriate servo performance is realized.

Such an operation of lowering both the rotation speed of the optical disk and the loop gain of the focusing control system can be easily realized by changing the reproduction/recording modes that may be provided with the optical disk apparatus.

The optical disk apparatus may have, as the reproduction/recording modes, a plurality of different modes that have different rotation speeds of the optical disk. There is a known optical disk apparatus having a plurality of mode of 48x, 40x, 32x, 24x, 8x and the like. For each mode, the loop gain is set in advance to a value appropriate for the rotation speed of that mode. A mode controller provided with the optical disk apparatus can freely change the loop gain as well as the rotation speed of the optical disk.

Therefore, by controlling the mode selection so that the current mode is changed to the next mode having the lower rotation speed than that of the current mode in the case where the driving of the focusing actuator is detected to be in the abnormal state when the focusing control is performed, not only the rotation speed of the optical disk but also the loop gain of the focusing control system can be appropriately lowered. Thus, the continuous reproduction/recording can be performed while the actuator is protected.

In addition, if the abnormal state is detected even when the mode is changed to the next mode so as to lower the rotation speed to a predetermined rotation speed, it is preferable to further change the mode to the next mode having the lower rotation speed than that of the current mode. Moreover, when the mode is changed so as to lower the rotation speed of the optical disk, the mode does not go back to the "old" mode.

Furthermore, when the rotation speed is relatively low (24x or 8x, for example), the loop gain of the focusing control system is set to a small value and therefore the power exceeding the acceptable power of the actuator is not supplied to the actuator in most cases. Thus, in such modes, the function of detecting the abnormal driving state may be made inoperative. In this case, even in the environment where the abnormal driving of the actuator occurs when the optical disk is rotated at a high speed, the reproduction/recording operation can be reliably performed in the mode having the lower rotation speed. Accordingly, the driving of the actuator can be prevented from stopping, thus providing a comfortable environment of use.

As described above, according to the present embodiment, even in the case where the focusing actuator is detected to be driven abnormally, the actuator can be protected from being damaged and the reproduction/recording operation for the optical disk can be performed continuously. In particular, when a mode changing operation is used, the continuous reproduction/recording operation can be easily performed while the actuator is protected appropriately. This is very effective in practical use.

In the above description, the focusing control in the optical disk apparatus 100 is described. Also, the tracking control is performed in the optical disk apparatus 100. In the tracking controller (not shown), a deviation signal, i.e., a tracking error signal (hereinafter, referred to as a TE signal) is generated for indicating a deviation of the converging point of the light beam on the optical disk 101 from the target track by using the signals from the photodetector 26 (see FIG. 4). Based on the TE signal, a tracking actuator is controlled in such a manner that the target track is scanned with the converging point of the light beam on the optical disk 101. The details of the configuration of the tracking controller and the tracking control operation will be described in another embodiment.

The abnormal state detection level (Fdlvl) is described as a constant level regardless of a state of the tracking control in the present embodiment. However, when the abnormal state detection level (Fdlvl) is changed-between a state where the tracking control is on, such as a state of a normal reproduction, and a state where the tracking control is off, such as a state of a searching operation, the focusing actuator can be more appropriately protected.

Such a change of the abnormal state detection level is effective in a case where the maximum rating power of the actuator is defined by the sum of the power supplied to the focusing actuator and that supplied to the tracking actuator. When the tracking control is not performed, the power supplied to the tracking actuator is zero. At this time, even if a relatively large power is supplied to the focusing actuator, the actuator is not damaged. Therefore, the abnormal state detection level (Fdlvl) for the focusing control can be set relatively high. On the other hand, a predetermined magnitude of the power is supplied to the tracking actuator when the tracking control is performed. Thus, it is necessary to set the abnormal state detection level (Fdlvl) to a relatively low-level and to reduce the acceptable power supplied to the focusing actuator. In this way, the actuator can be appropriately protected.

Figure 1A:
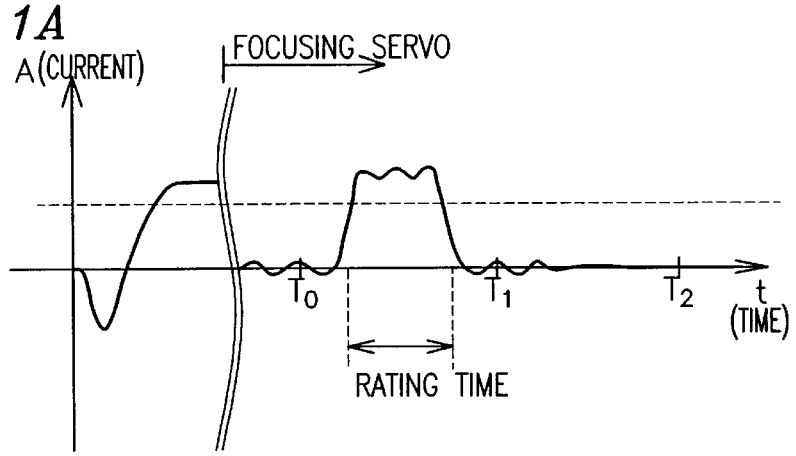
FIGS. 1A, 1B and 1C are diagrams showing a driving current for a focusing actuator.
Figure 1B:
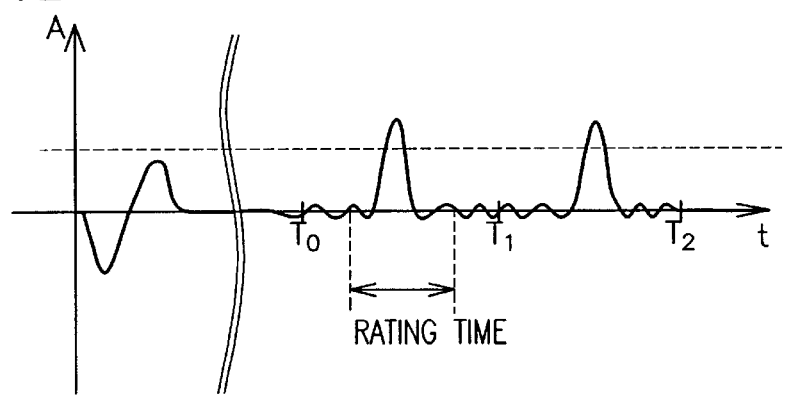
Figure 1C:
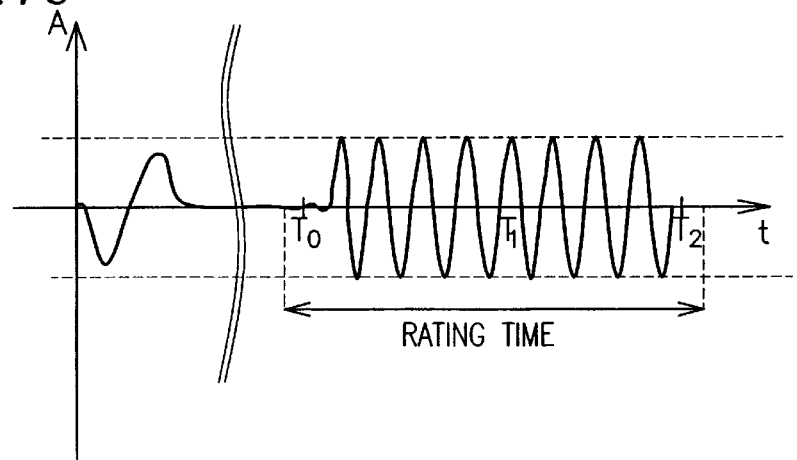
Figure 2:
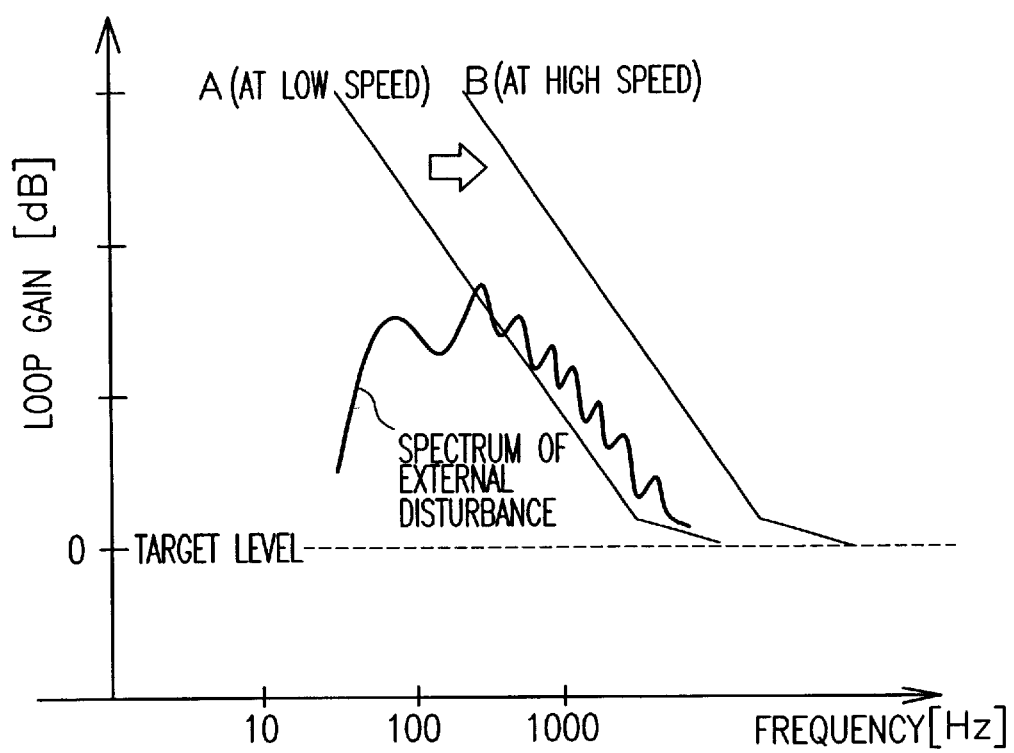
FIG. 2 shows loop characteristics of a focusing servo system.

As described above, according to the present embodiment, the magnitude of the signal corresponding to the driving signal of the focusing actuator is integrated over the predetermined time period, and based on the integration result the abnormal state of the focusing actuator driving is detected. In the case where the abnormal state is detected, the rotation speed of the optical disk is reduced or the loop gain of the focusing control system is lowered so as to make the magnitude of the signal for driving the focusing actuator smaller, thereby controlling the power supplied to the focusing actuator. Therefore, the focusing actuator can be appropriately protected against an AC component (see FIG. 1C) of the large driving current occurring when the reproduction/recording operation is performed for the disk rotating at a higher speed with waver. Moreover, the reproduction/recording operation can be performed stably.

It should be noted that the above-mentioned manner of protection of the focusing actuator can be applied not only when information is reproduced from the optical disk but also when information is recorded onto the optical disk. The optical disk apparatus of the present embodiment may be a recordable/reproducible optical disk apparatus, a reproduction-only optical disk apparatus or a recording-only optical disk apparatus. In addition, the optical disk apparatus of the present embodiment can be used for performing the recording/reproduction operation for various types of optical disks including a recording layer having a state that is changeable by the radiation of the light beam (a phase-change layer, a magneto-optical medium layer or the like).

Embodiment 2

Figure 7:
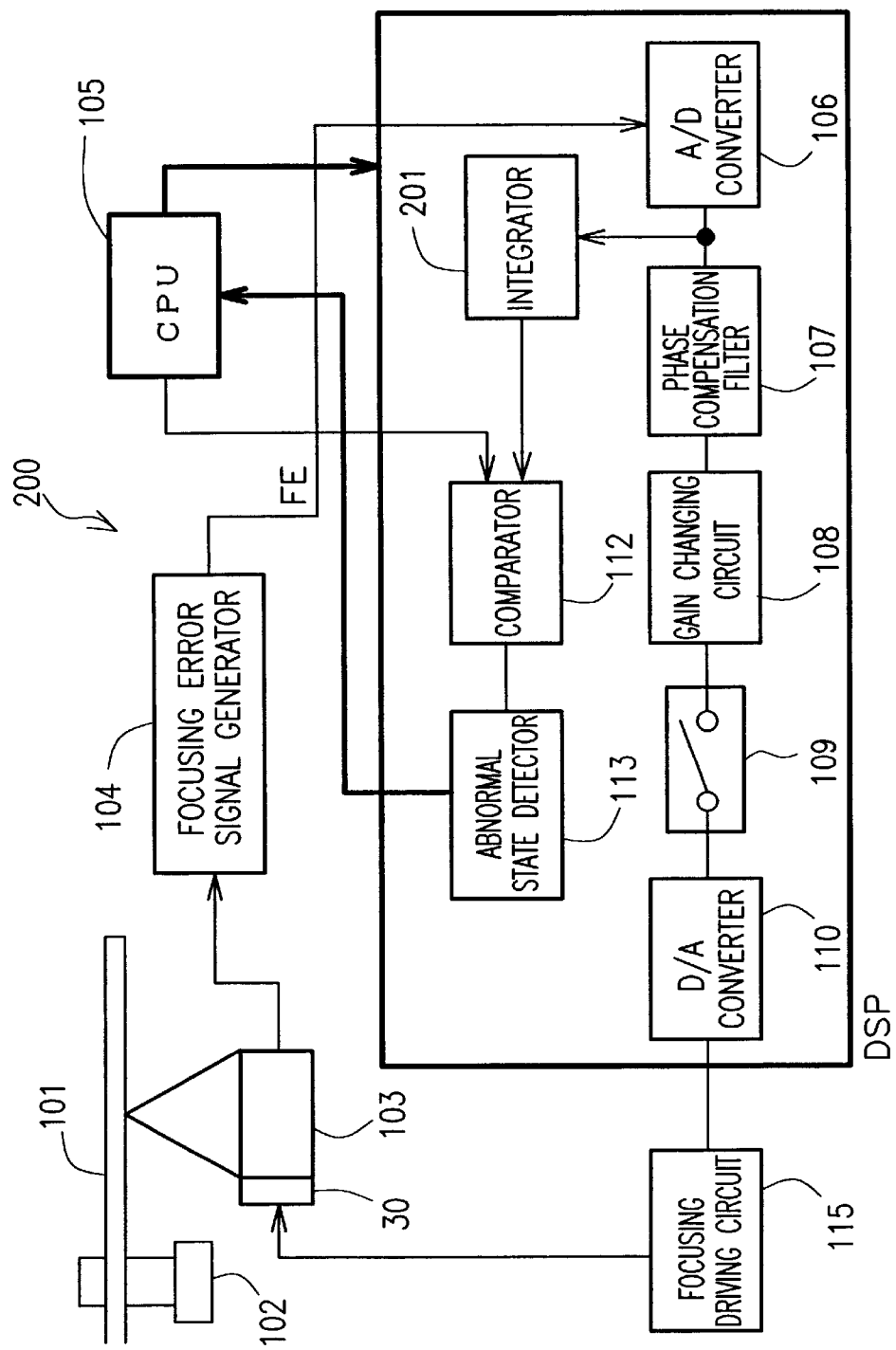
FIG. 7 is a block diagram illustrating a structure of an optical disk apparatus according to the second embodiment of the present invention.

FIG. 7 is a block diagram schematically showing the structure of an optical disk apparatus 200 according to the second embodiment of the present invention. The optical disk apparatus 200 is different from the optical disk apparatus 100 of the first embodiment in that an integrator 201 for integrating a magnitude of the FE signal that has been converted to the digital signal by the A/D converter 106 over a predetermined time period is provided in place of the integrator 111. In the present embodiment, a signal corresponding to the FE signal is used for detecting the abnormal driving state of the focusing actuator, unlike the first embodiment in which the signal corresponding to the driving signal for the focusing actuator is used. The same components as those described in the first embodiment are labeled with the same reference numerals and the detailed description thereof is omitted in the present embodiment.

The FE signal that has been digitalized by passing through the A/D converter 106 is input to the integrator 201 that integrates the magnitude of the FE signal over a predetermined time period to output the integration result to the comparator 112. The comparator 112 compares the integration result from the integrator 201 with the abnormal state detection level (Felvl) set by the CPU 105. When the integration result exceeds the abnormal state detection level (Felvl), it is determined that the focusing actuator is driven abnormally. Thus, the abnormal state detector 113 sends the CPU 105 the signal indicative of the abnormal state.

The process of detecting the abnormal driving state of the focusing actuator in the present embodiment is the same as that in the first embodiment except that the signal corresponding to the FE signal is used for the abnormal state detection, instead of the signal corresponding to the driving signal for the focusing actuator. Thus, the detailed description of the detection process is omitted.

When the abnormal driving state of the focusing actuator is detected after the magnitude of the digital FE signal is integrated over the predetermined time period, the operation of lowering the rotation speed of the optical disk and/or the operation of lowering the loop gain of the focusing control is performed, as in the first embodiment. This realizes the stable reproduction/recording operation while the focusing actuator is protected appropriately against the AC component of the large driving current occurring when the recording/reproducing is performed for the optical disk rotating at a higher speed with waver.

In addition, as in the first embodiment, the actuator can be protected more appropriately by changing the abnormal state detection level (Felvl) between the state where the tracking control is on, such as the state where the normal reproduction is performed, and the state where the tracking control is off, such as the state where the search operation is performed.

Embodiment 3

Figure 8:
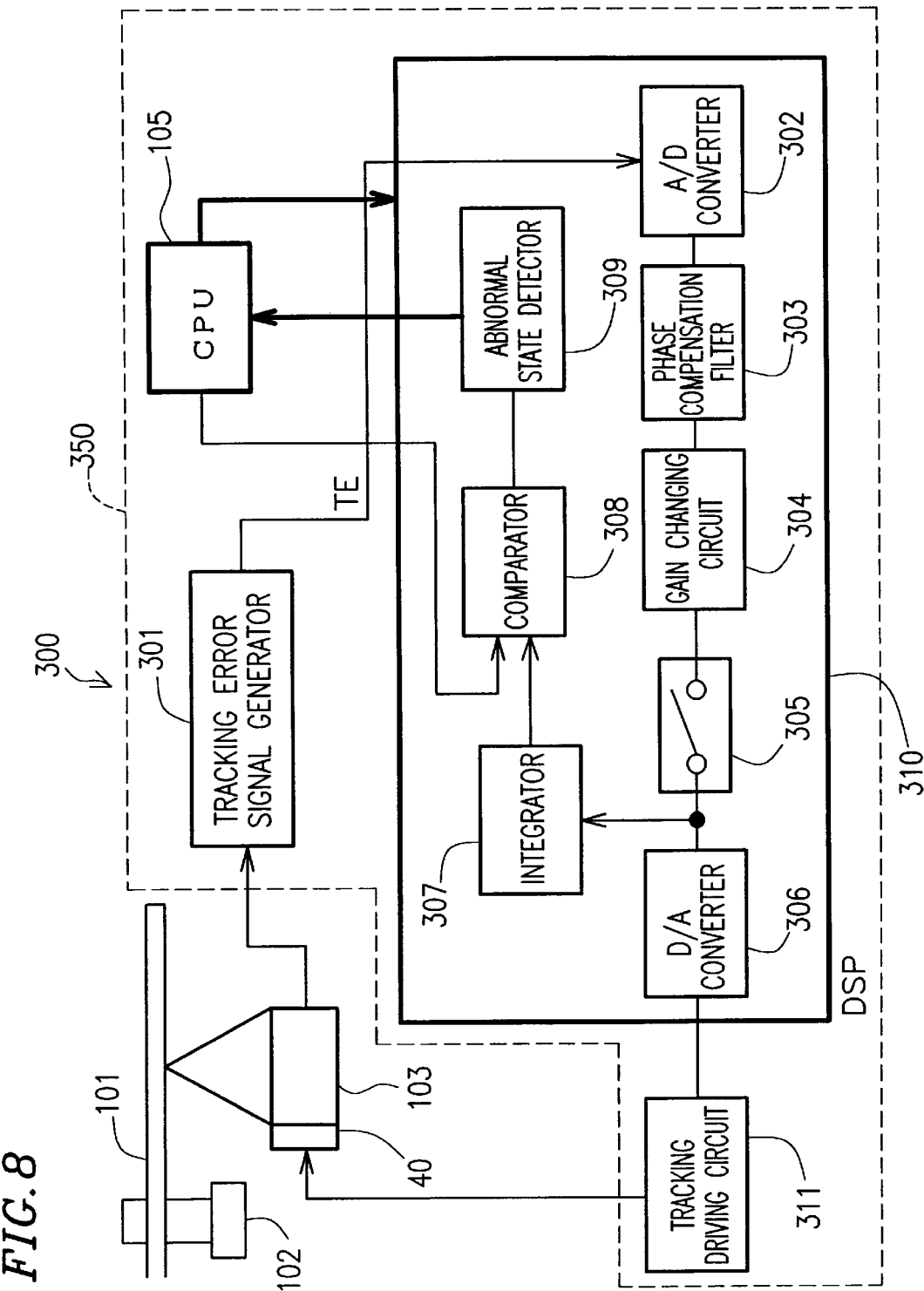
FIG. 8 is a block diagram illustrating a structure of an optical disk apparatus according to the third embodiment of the present invention.

FIG. 8 is a block diagram schematically showing the structure of an optical disk apparatus 300 according to the third embodiment of the present invention. In the third embodiment, the method of detecting the abnormal state that is applied for protecting the focusing actuator in the first embodiment is applied to the tracking actuator. The same components as those described in the first embodiment are labeled with the same reference numerals and the detailed description thereof is omitted in the present embodiment.

The optical disk apparatus 300 includes the disk motor 102 for rotating the optical disk 101 at a predetermined rotation speed; an optical head 103 for reproducing/recording information from/onto the optical disk 101; a tracking actuator 40 for moving the light beam radiated from the optical head 103 to the optical disk 101 in a direction traversing the track provided on the optical disk 101; and a tracking controller 350 for controlling the tracking actuator 40 to scan a predetermined track with the light beam. In addition, the optical disk apparatus 300 includes the traverse motor (not shown) for moving the whole optical head 103 in such a direction that the optical head 103 traverses the track.

As the tracking actuator 40, a device that can pivotally move the converging lens in a plane substantially parallel to the surface of the optical disk may be used, for example. It should be noted that the track scanned by the optical disk apparatus 300 is, for example, a groove formed on the surface of the optical disk, a land formed between the grooves, or both of the groove and the land.

The tracking controller 350 includes a tracking error signal generator 301, a digital signal processor (DSP) 310, and a tracking driving circuit 311.

To the tracking error signal generator 301 is input the output signals from the four-divided photodetector 26 (see FIG. 4). The tracking error signal generator 301 adds the signals output from two diagonal detecting parts of the four-divided photodetector 26. Also, the signals from other two diagonal detecting parts are added to each other. The resultant signals are sliced in a comparator to be binary signals, respectively. The sliced signals are input to a phase comparator that compares the phases of the sliced signals. The phase comparator outputs a signal corresponding to the advance or delay of the phase to a differential amplifier. An output signal from the differential amplifier indicates a deviation of the converging point of the light beam on the optical disk 101 from the track. The thus generated signal is called the tracking error signal (TE signal) and is input to the DSP 310. The optical disk apparatus 300 controls the tracking actuator 40 based on the TE signal in such a manner that the target track is scanned with the converging point of the light beam on the optical disk 101. The above-mentioned detection method of the TE signal is called as "Phase difference method." Please note that the TE signal may be detected by another detection method, such as "Push-pull method."

The TE signal input to the DSP 310, that is analog, is digitalized by the A/D converter 302 and is then input to a phase compensation filter 303 that is a digital filter constituted by an adder, a multiplier and a delay circuit. The phase compensation filter 303 compensates the phase of the tracking control system. A tracking control signal having the phase compensated by the phase compensation filter 303 is input to a gain changing circuit 304 for changing a loop gain of the tracking control system. Please note that the term "tracking control signal" as used herein means various signals used for the tracking control that contain information related to the tracking error. Thus, the "tracking control signal" may include the TE signal mentioned above, the digital signal processed in the DSP, a tracking actuator driving signal (described later) and may be analog or digital. The signal output from the gain changing circuit 304 is then input to a switch 305 for opening/closing the loop of the tracking control system. The switch 305 is turned on when the tracking control (tracking servo) is performed.

The tracking control signal (digital signal) that passed through the switch 305 is converted to an analog signal by the D/A converter 306, and is then input to the tracking driving circuit 311. In the tracking driving circuit 311, the tracking control signal is subjected to an appropriate current amplification and an appropriate level adjustment, so that a tracking actuator driving signal is generated. In this way, the tracking driving circuit 311 drives the tracking actuator 40. Therefore, the tracking actuator 40 is driven in such a manner that a predetermined track is scanned with the converging point of the light beam on the optical disk 101, realizing the tracking control.

Preferably, the driving of the traverse motor is also controlled so that the converging point of the light beam on the optical disk 101 is coincident with the center of the converging lens (that is, an optical axis of the light beam radiated to the optical disk 101 is coincident with an optical axis of the converging lens), when the track is scanned with the converging point of the light beam.

The tracking control signal that passed through the switch 305 is also input to the integrator 307 that integrates the magnitude of the tracking control signal input thereto over a predetermined time period so as to output the integration result to a comparator 308. The comparator 308 compares the integration result from the integrator 307 with an abnormal state detection level (Tdlvl) determined by the CPU 105. When the integration result exceeds the abnormal state detection level (Tdlvl), it is determined that the tracking actuator is driven abnormally. Thus, an abnormal state detector 309 sends the CPU 105 a signal indicating that the tracking actuator is driven abnormally.

Figure 9:
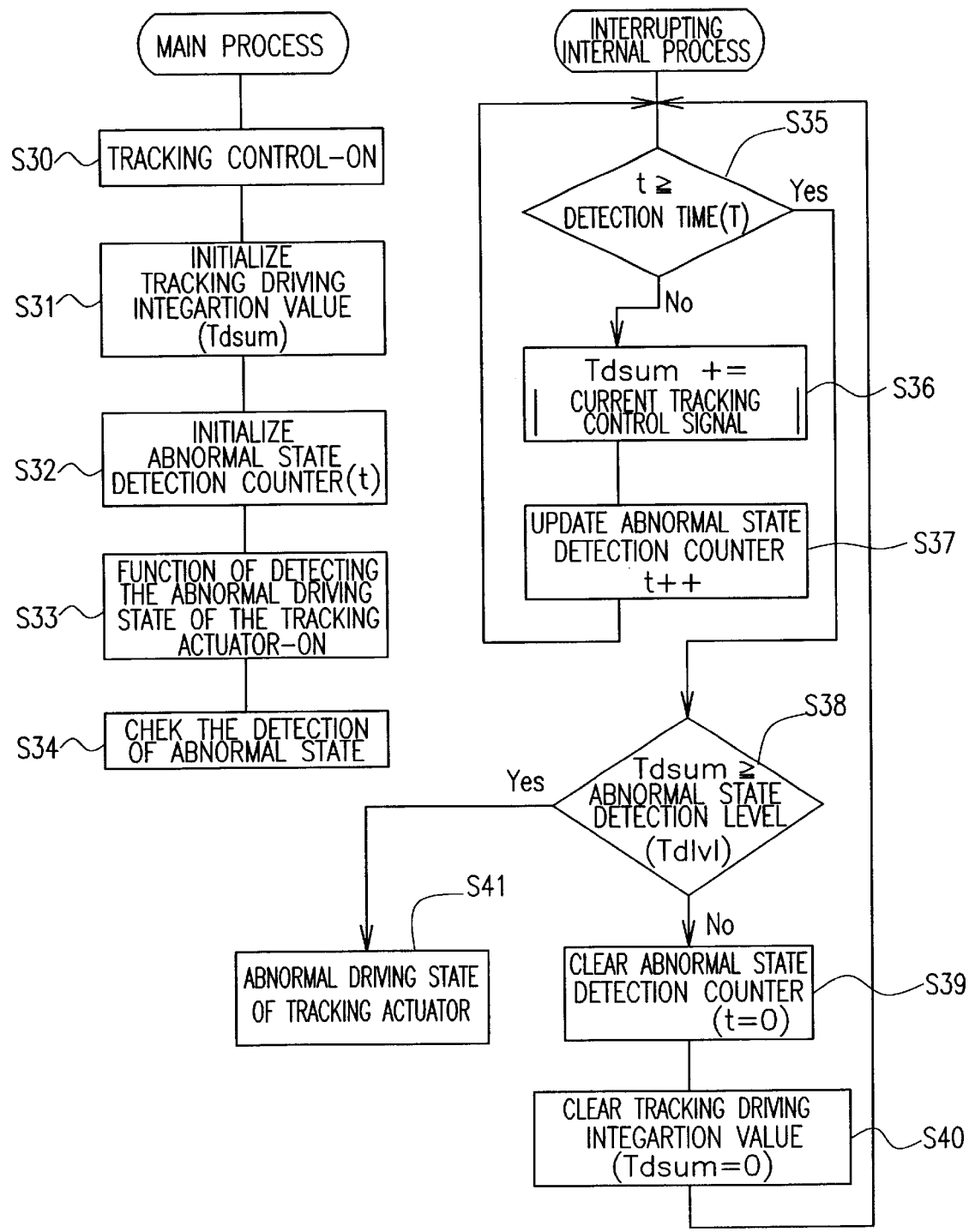
FIG. 9 is a flowchart illustrating an abnormal driving state detection process for a tracking actuator in the third embodiment.

Next, a process of detecting the abnormal state of the tracking actuator driving in the present embodiment is described, referring to FIGS. 8 and 9. FIG. 9 is a flowchart of the detection process.

A process executed by software in the DSP 310 is composed of the main process and the interrupting internal process, as described in the first embodiment. In Step S30 of the main process, the switch 305 is closed, thus starting the tracking control to scan a predetermined track with the converging point of the light beam on the optical disk 101. In Steps S31 and S32, a tracking driving integration value (Tdsum) and an abnormal state detection counter (t) in the integrator 307 are initialized. A function of detecting the abnormal state of the tracking actuator driving is then turned on in Step S33, thereby starting the integration of the magnitude of the tracking control signal corresponding to the driving signal for the tracking actuator in the integrator 307.

Then, it is checked whether or not the abnormal state is detected in Step S34. At this time, the main process is in a state of waiting a next command from the CPU 105. Although in the actual optical disk apparatus the focusing control has to be performed in advance of the start of the tracking control, the description thereof is omitted in the present embodiment.

The interrupting internal process is described below. When the function of detecting the abnormal state of the tracking actuator driving is turned on in Step S33 of the main process, the DSP 310 starts the following detection routine in the interrupting internal process.

In Step S35, it is determined whether or not the abnormal state detection counter (t) reaches a predetermined detection time (T). When the counter (t) does not reach the predetermined detection time (T), an absolute value or unsigned value (i.e., magnitude) of a current tracking control signal that has passed through the switch 305, is added to the current tracking driving integration value (Tdsum) in Step S36, thereby updating the tracking driving integration value (Tdsum). Moreover, the abnormal state detection counter (t) is also updated in Step S37, and then the process goes back to Step S35.

When the abnormal state detection counter (t) reaches the predetermined detection time (T) in Step S35, the tracking driving integration value (Tdsum) is compared with the abnormal state detection level (Tdlvl) set in the comparator 308 by the CPU 105, in Step S38. In a case where the tracking driving integration value (Tdsum) does not exceed the abnormal state detection level (Tdlvl), the abnormal state detection counter (t) and the tracking driving integration value (Tdsum) are reset to zero in Steps S39 and S40, respectively, and then the process goes back to Step S35. In another case where the tracking driving integration value (Tdsum) exceeds the abnormal state detection level (Tdlvl), it is determined that the tracking actuator is driven abnormally in Step S41, thus notifying that to the main process. The main process notifies the CPU 105 via the abnormal state detector 309 that the driving of the tracking actuator is in the abnormal state. Please note that the predetermined detection time (T) and the abnormal state detection level (Tdlvl) are set appropriately in advance based on, for example, the maximum rating power of the actuator (continuously 1W or less and 2W or less in two seconds, for example) and the like, as in the first embodiment.

Figure 10A:
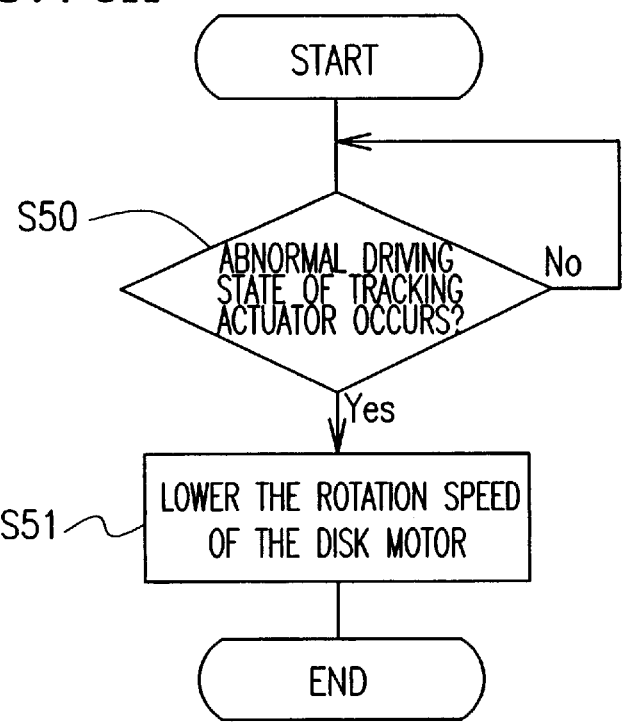
FIGS. 10A and 10B are flowcharts illustrating a process performed when the abnormal state is detected in the third embodiment.
Figure 10B:
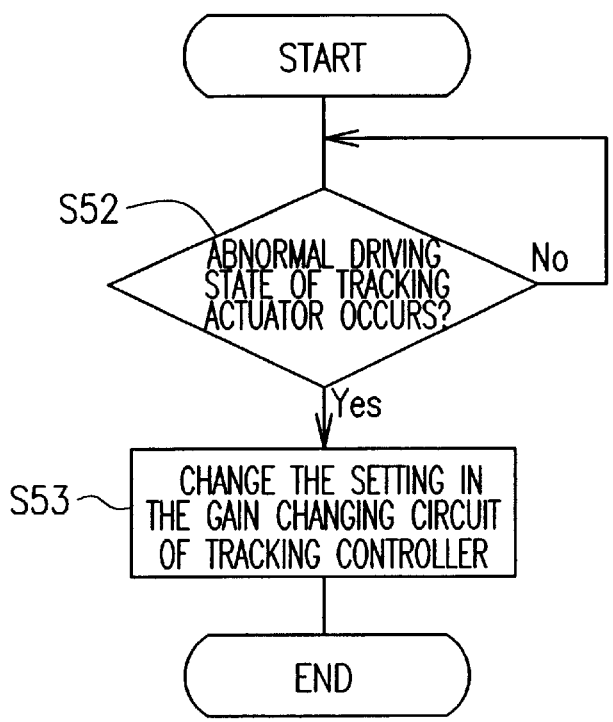

Next, a process after the abnormal driving of the tracking actuator is detected in the present embodiment is described, referring to FIGS. 10A and 10B showing the flows of the process, in addition to FIG. 8.

FIG. 10A is a flowchart in a case of protecting the tracking actuator by lowering the rotation speed of the disk motor 102, while FIG. 10B is a flowchart in a case of protecting the tracking actuator by lowering the loop gain of the tracking control system.

First, the case of lowering the rotation speed of the disk motor 102 is described. As shown in FIG. 10A, it is determined whether or not the driving of the tracking actuator is in the abnormal state in Step S50. When the tracking actuator is driven normally, the process goes back to Step S50. The detection of the abnormal state is performed by the abnormal state detector 309 in the DSP 310 as described above, and the detection result is notified to the CPU 105. The CPU 105 receiving from the DSP 310 the notification that the driving of the tracking actuator is in the abnormal state reduces the rotation speed of the disk motor 102 in Step S51. The magnitude of the power supplied to the tracking actuator in order to follow an eccentric rotation of the optical disk 101 is in proportion to a square of the rotation speed of the disk motor 102. Thus, the power supplied to the tracking actuator can be largely reduced (that is, the magnitude of the tracking actuator driving signal can be reduced) by lowering the rotation speed of the disk motor 102. Therefore, the tracking actuator can be appropriately protected by lowering the rotation speed of the disk motor 102 so that the tracking driving integration value (Tdsum) does not exceed the abnormal state detection level (Tdlvl). In addition, since the tracking servo can be kept in the appropriate state, the reproduction/recording operation for the optical disk can be performed continuously.

Next, the case of lowering the loop gain of the tracking control system is described. As shown in FIG. 10B, it is determined whether or not the driving of the tracking actuator is in the abnormal state in Step S52. When the tracking actuator is driven normally, the process goes back to Step S52. On the other hand, when the tracking actuator is driven abnormally, the setting of the gain changing circuit 304 is changed so as to lower the loop gain of the tracking control system in such a manner that the tracking driving integration value (Tdsum) does not exceed the abnormal state detection level (Tdlvl) in Step S53. Thus, the power supplied to the tracking actuator is reduced, thereby protecting the actuator.

In addition, also in the present embodiment, when both of the rotation speed of the optical disk but also the loop gain of the tracking control system are lowered, the power supplied to the actuator can be effectively reduced while the appropriate tracking servo is realized, as in the first embodiment. Such an operation can be realized by changing the modes of the optical disk apparatus.

As described above, according to the present embodiment, the signal corresponding to the driving signal for the tracking actuator is subjected to the magnitude integration over a predetermined time period, and based on the integration result the abnormal state of the driving of the tracking actuator can be detected. When the abnormal state is detected, the magnitude of the signal for driving the tracking actuator is made smaller by lowering the rotation speed of the optical disk or the loop gain of the tracking control system, thereby the power supplied to the tracking actuator is controlled. In this way, the tracking actuator can be protected appropriately against the AC component of the large driving current occurring when the reproduction/recording operation is performed for the optical disk eccentrically rotating at a higher speed.

Moreover, in the above description, the embodiment in which the tracking actuator for tracking and the transverse motor for moving the whole optical head are provided as separate components is described. However, instead of using the tracking actuator and the transverse motor, a moving means having both the functions mentioned above (a moving mechanism having a swing arm, for example) can be used.

Embodiment 4

Figure 11:
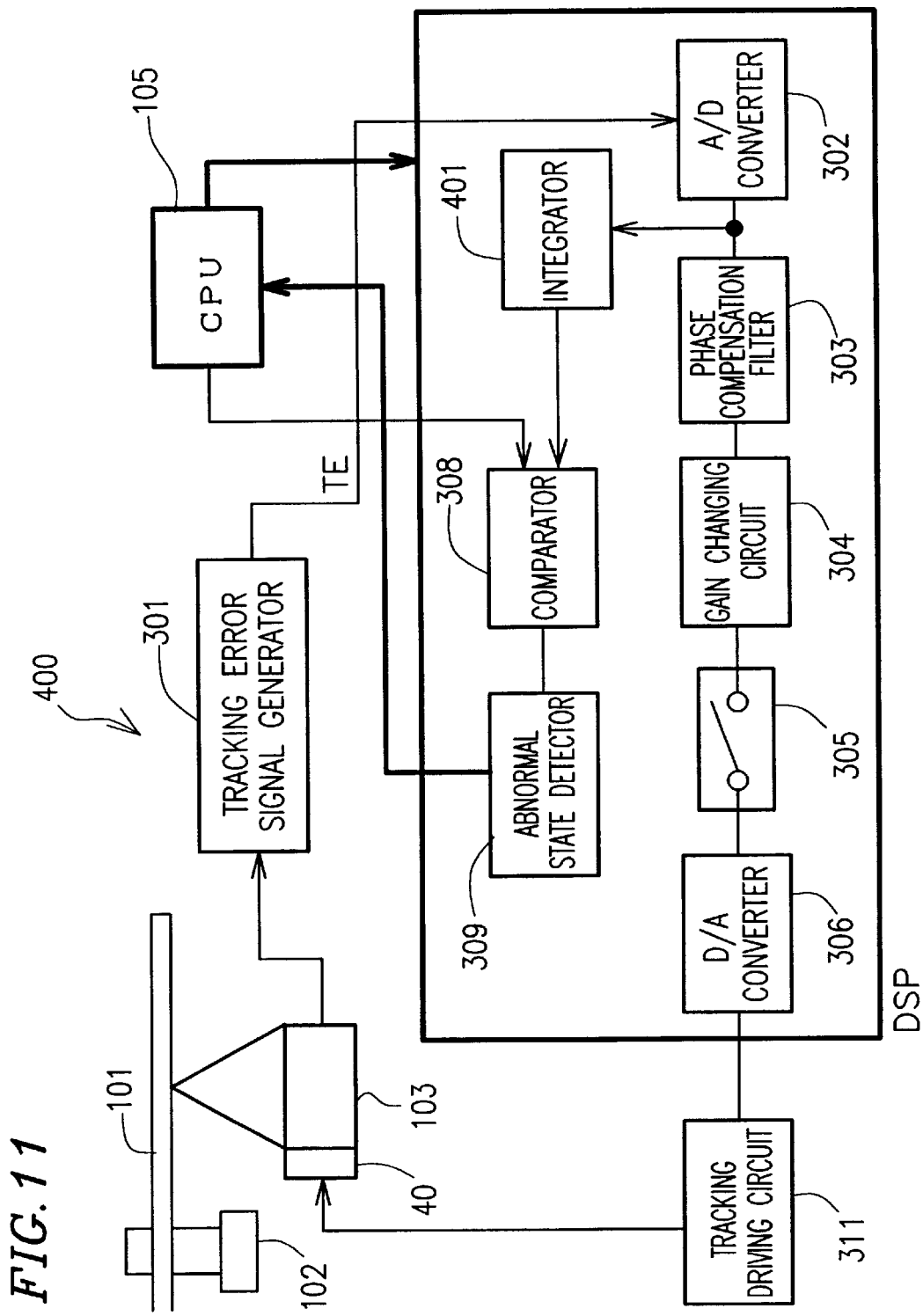
FIG. 11 is a block diagram illustrating a structure of an optical disk apparatus according to the fourth embodiment of the present invention.

FIG. 11 is a block diagram schematically showing the structure of an optical disk apparatus 400 according to the fourth embodiment of the present invention. The optical disk apparatus 400 is different from the optical disk apparatus 300 of the third embodiment in that an integrator 401 that integrates over a predetermined time period the magnitude of the TE signal digitalized in the A/D converter 302, in place of the integrator 307. In the present embodiment, a signal corresponding to the TE signal is used for detecting the abnormal state of the driving of the tracking actuator, instead of the signal corresponding to the driving signal for the tracking actuator in the third embodiment. The same components as those described in the third embodiment are labeled with the same reference numerals and the detailed description thereof is omitted in the present embodiment.

The TE signal that has been digitalized by passing through the A/D converter 302 is input to the integrator 401. The integrator 401 integrates the magnitude of the TE signal over a predetermined time period and outputs the integration result to the comparator 308. The comparator 308 compares the integration result from the integrator 401 with the abnormal state detection level (Telvl) set by the CPU 105. When the integration result exceeds the abnormal state detection level (Telvl), the driving of the tracking actuator is determined to be in the abnormal state. In this case, the abnormal state detector 309 sends the CPU 105 the signal indicative of the abnormal state.

The process of detecting the abnormal state of the tracking actuator driving and the process following the detection process in the present embodiment are the same as those in the third embodiment except that the signal corresponding to the TE signal is used for the detection of the abnormal state, instead of the signal corresponding to the driving signal for the tracking actuator. Therefore, the detailed description of the processes is omitted in the present embodiment.

According to the present embodiment, the signal corresponding to the TE signal is subjected to the magnitude integration over a predetermined time period, and based on the integration result the abnormal state of the driving of the tracking actuator is detected. In the case where the abnormal state is detected, the magnitude of the driving signal for the tracking actuator is reduced by lowering the rotation speed of the optical disk and/or lowering the loop gain of the tracking control system, thereby controlling the power supplied to the tracking actuator. Therefore, the tracking actuator can be protected appropriately against the AC component of the large driving current occurring when the reproduction/recording operation is performed for the optical disk eccentrically rotating at a higher speed. In addition, the reproduction/recording operation can be performed stably.

Embodiment 5

Figure 12:
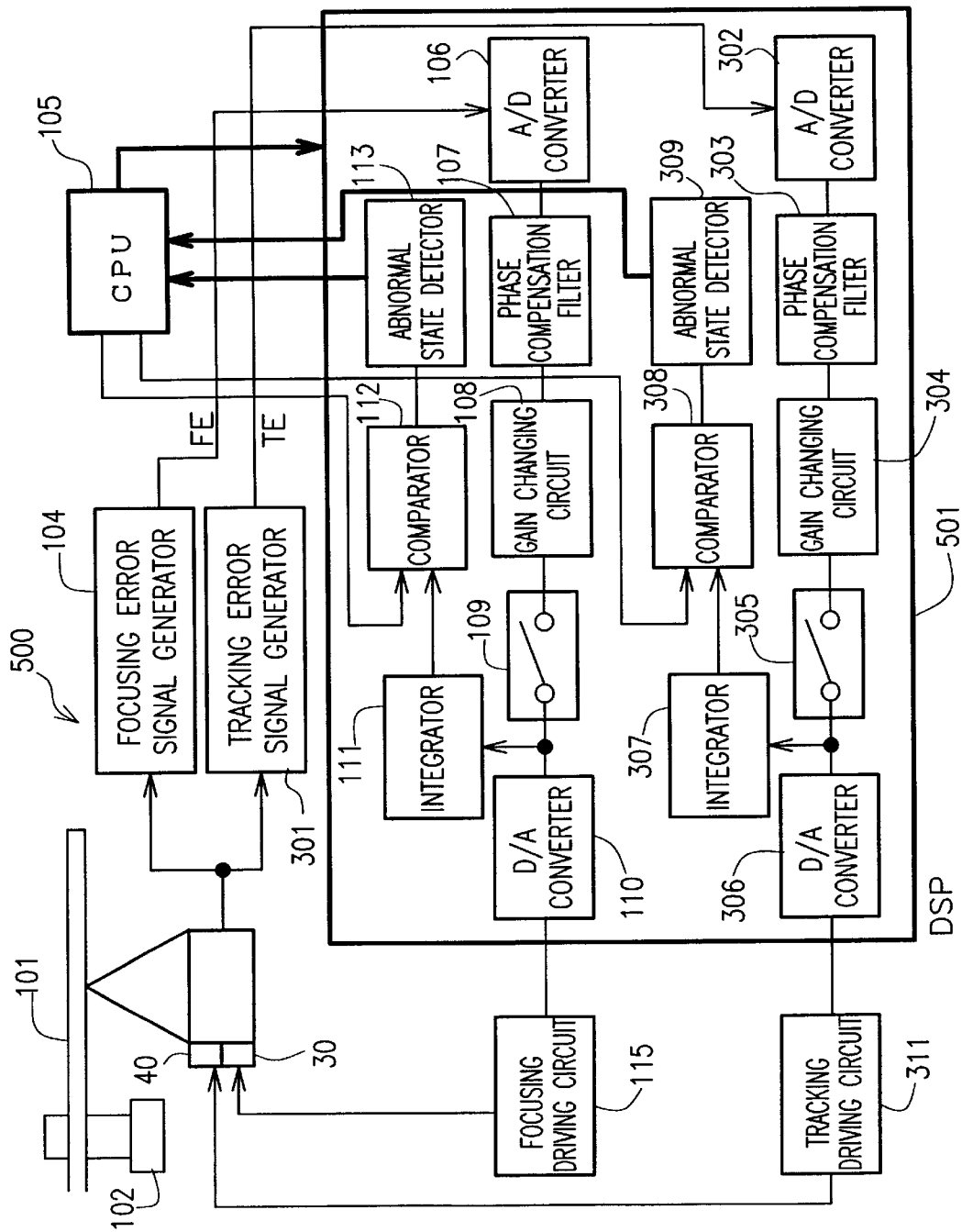
FIG. 12 is a block diagram illustrating a structure of an optical disk apparatus according to the fifth embodiment of the present invention.

FIG. 12 is a block diagram schematically showing the structure of an optical disk apparatus 500 according to the fifth embodiment of the present invention. The optical disk apparatus 500 is realized by combining the structure of the optical disk apparatus 100 of the first embodiment (see FIG. 3) and that of the optical disk apparatus 300 (see FIG. 8). The same components as those described in the first and third embodiments are labeled with the same reference numerals and the detailed description thereof is omitted in the present embodiment.

In the optical disk apparatus 500, the signals from the photodetector 24 for the focusing error detection (see FIG. 4) in the optical head 103 are input to the focusing error signal generator 104, while the signals from the photodetector 26 for the tracking error detection (see FIG. 4) are input to the tracking error signal generator 301. The focusing error signal generator 104 and the tracking error signal generator 301 generate the FE signal for the focusing control and the TE signal for the tracking control, respectively. The optical disk apparatus 500 controls the focusing actuator 30 and the tracking actuator 40 based on the FE signal and the TE signal, respectively.

In the focusing control system, the focusing control signal that passed through the switch 109 provided in a DSP 501 is input to the integrator 111. The integrator 111 integrates the magnitude of the focusing control signal over a predetermined time period and outputs the integration result to the comparator 112. The comparator 112 compares the integration result from the integrator 111 with the abnormal state detection level (Fdlvl) set by the CPU 105. When the integration result exceeds the abnormal state detection level (Fdlvl), the driving of the focusing actuator is determined to be in the abnormal state. Thus, the abnormal state detector 113 sends the is CPU 105 the signal indicating that the driving of the focusing actuator is in the abnormal state.

In the tracking control system, the tracking control signal that passed through the switch 305 is input to the integrator 307. The integrator 307 integrates the magnitude of the tracking control signal over a predetermined time period and outputs the integration result to the comparator 308. The comparator 308 compares the integration result from the integrator 307 with the abnormal state detection level (Tdlvl) set by the CPU 105. When the integration result exceeds the abnormal state detection level (Tdlvl), the driving of the tracking actuator is determined to be in the abnormal state. Thus, the abnormal state detector 309 sends the CPU 105 the signal indicating that the driving of the tracking actuator is in the abnormal state.

Figure 13:
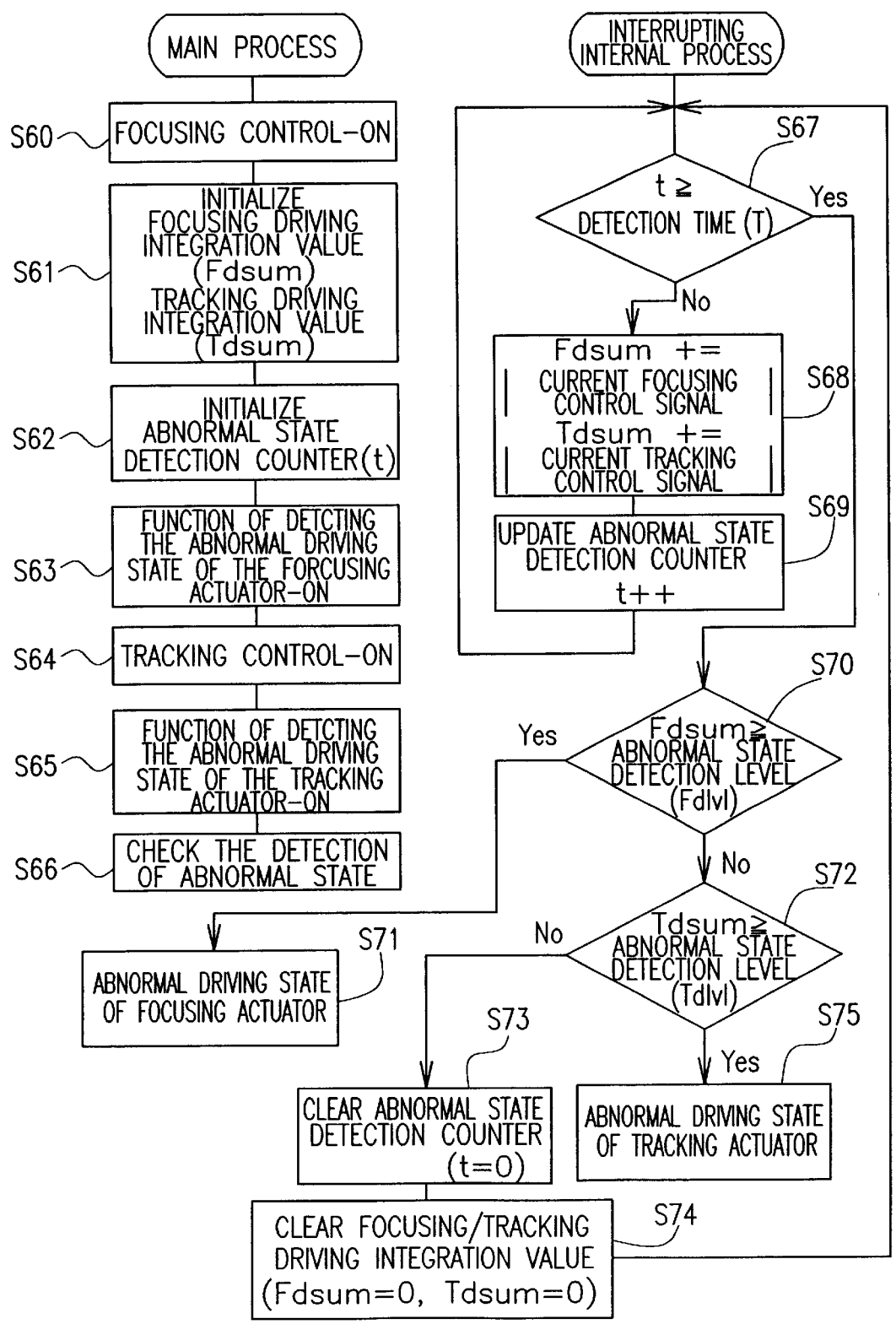
FIG. 13 is a flowchart illustrating an abnormal driving state detection process for an actuator in the fifth embodiment.

Herein, the process of detecting the abnormal driving state in the present embodiment is described in detail, referring to the block diagram of FIG. 12 and the flowchart of FIG. 13.

The process executed by software in the DSP 501 is composed of the main process and the interrupting internal process, as described in the first embodiment.

In Step S60 of the main process, the switch 109 is closed thereby starting the focusing control in such a manner that the light beam on the optical disk 101 always has a predetermined converging state. Then, in Steps S61 and S62, the focusing is driving integration value (Fdsum) in the integrator 111, the tracking driving integration value (Tdsum) in the integrator 307 and the abnormal state detection counter (t) are initialized. The function of detecting the abnormal driving state of the focusing actuator is then turned on in Step S63, thereby starting the integration of the magnitude of the focusing control signal in the integrator 111.

Then, the switch 305 is closed in Step S64, so as to start the tracking control in such a manner that a predetermined track is scanned with the converging spot of the light beam on the optical disk 101. When the function of detecting the abnormal driving state of the tracking actuator is turned on in Step S65, the integration of the magnitude of the tracking control signal is started in the integrator 307. Then, it is checked whether or not the abnormal state is detected in Step S66, while main process goes to the state of waiting the next command from the CPU 105.

The DSP 501 starts the following detection routine in the interrupting internal process when the function of detecting the abnormal driving state of the focusing actuator and the function of detecting the abnormal driving state of the tracking actuator are turned on in Steps S63 and S65 of the main process, respectively.

It is determined whether or not the abnormal state detection counter (t) reaches the predetermined detection time (T) in Step S67. In the case where the counter (t) does not reach the predetermined detection time (T), the magnitude of the current focusing control signal that has passed through the switch 109 is added to the current focusing driving integration value (Fdsum) in Step S68, thereby the focusing driving integration value (Fdsum) is updated. Similarly, the magnitude of the current tracking control signal that has passed through the switch 305 is added to the tracking driving integration value (Tdsum), thereby updating the tracking driving integration value (Tdsum). Moreover, the abnormal state detection counter (t) is also updated (i.e., is increased) in Step S69, and thereafter the process goes back to Step S67.

In the case where the abnormal state detection counter (t) reaches the predetermined detection time (T) in Step S67, the focusing driving integration value (Fdsum) and the abnormal state detection level (Fdlvl) set in the comparator 112 by the CPU 105 are compared with each other in Step S70. When the focusing driving integration value (Fdsum) exceeds the abnormal state detection level for the focusing actuator (Fdlvl), the driving of the focusing actuator is determined to be in the abnormal state in Step S71, notifying that to the main process. The main process then notifies the CPU 105 via the abnormal state detector 113 that the focusing actuator is driven abnormally. On the other hand, when the focusing driving integration value (Fdsum) does not exceed the abnormal state detection level (Fdlvl), the tracking driving integration value (Tdsum) and the abnormal state detection level for the tracking actuator (Tdlvl) set in the comparator 308 by the CPU 105 are compared with each other. When the tracking driving integration value (Tdsum) does not exceed the abnormal state detection level (Tdlvl), the abnormal state detection counter (t), the focusing driving integration value (Fdsum) and the tracking driving integration value (Tdsum) are reset to zero, and the process goes back to Step S67. On the other hand, when the tracking driving integration value (Tdsum) exceeds the abnormal state detection level (Tdlvl), it is determined that the tracking actuator is driven abnormally in Step S75, notifying that to the main process. The main process that has received the notification notifies the CPU 105 via the abnormal state detector 309.

The predetermined detection time (T) and the abnormal state detection levels (Fdlvl and Tdlvl) in the above description are appropriately set based on, for example, the maximum rating power of the actuator (continuously 1W or less and 2W or less in two seconds, for example).

Figure 14A:
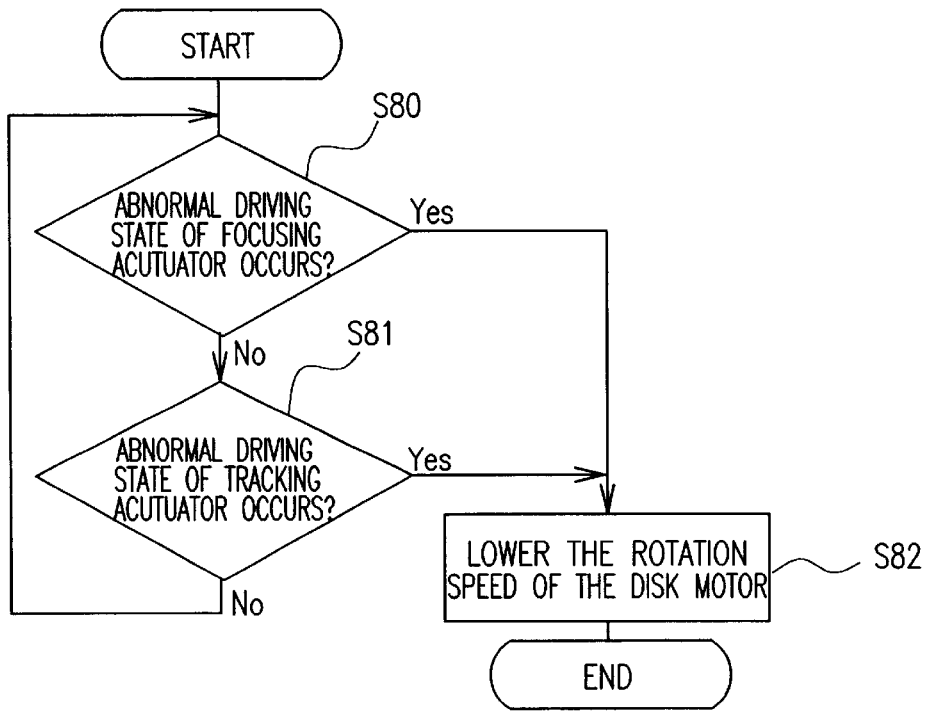
FIGS. 14A and 14B are flowcharts illustrating a process performed when the abnormal state is detected in the fifth embodiment.
Figure 14B:
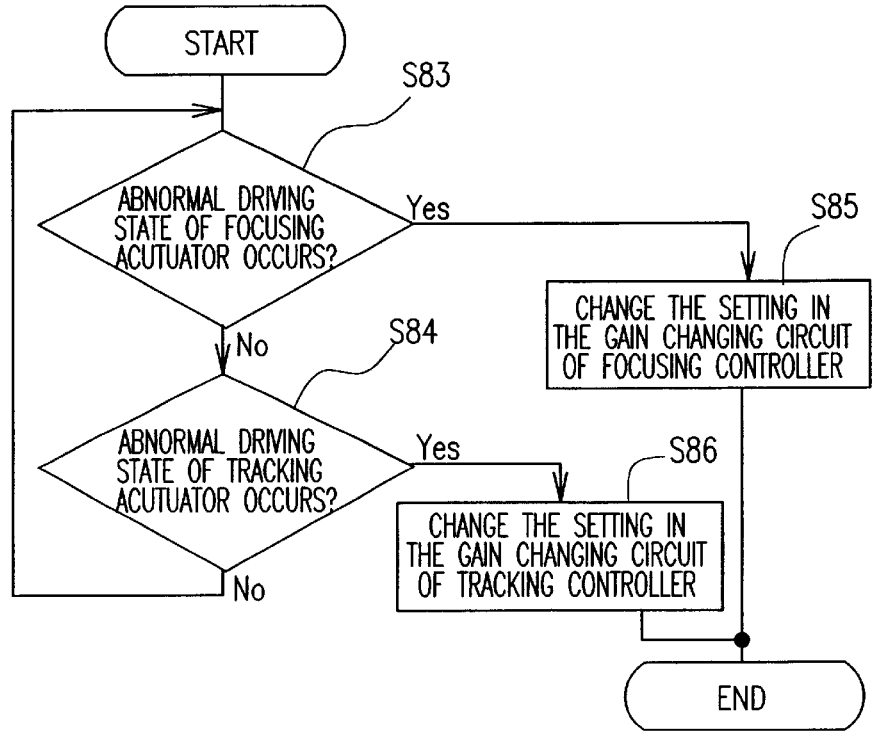

Next, the process following the detection of the abnormal state in the present embodiment is described, referring to the block diagram of FIG. 13 and flowcharts of FIGS. 14A and 14B.

FIG. 14A is the flowchart in the case of protecting the focusing/tracking actuator by lowering the rotation speed of the disk motor 102, while FIG. 14B is the flowchart in the case of protecting the focusing/tracking actuator by lowering the loop gain of the focusing and/or tracking control system.

First, the case of lowering the rotation speed of the disk motor 102 is described. As shown in FIG. 14A, it is determined whether or not the abnormal state of the focusing actuator driving occurs in Step S80. When the abnormal driving state of the focusing actuator does not occur, it is then determined whether or not the abnormal driving state of the tracking actuator occurs in Step S81. If the abnormal state is not determined to occur in Step S81, the process goes back to Step S80. When the CPU 105 received the notification of the abnormal state for either the focusing actuator or the tracking actuator from the DSP 501 in Step S80 or S81, the CPU 105 reduces the rotation speed of the disk motor 102. More specifically, in the case of the abnormal state of the focusing actuator driving, the rotation speed of the disk motor 102 is reduced in such a manner that the focusing driving integration value (Fdsum) does not exceed the abnormal state detection level (Fdlvl) in Step S82. In the case of the abnormal state of the tracking actuator driving, the rotation speed of the disk motor 102 is reduced in such a manner that the tracking driving integration value (Tdsum) does not exceed the abnormal state detection level (Tdlvl) in Step S82. Thus, the reproduction/recording operation can be performed for the optical disk 101 stably, while the focusing/tracking actuator is protected appropriately.

Next, the case of reducing the loop gain of the focusing/tracking control system is described. As shown in FIG. 14B, it is determined whether or not the abnormal state of the focusing actuator driving occurs in Step S83. When the abnormal state does not occur, it is then determined whether or not the abnormal state of the tracking actuator driving occurs in Step S84. If the abnormal driving state of the tracking actuator is not determined to occur in Step S84, the process goes back to Step S83. When the CPU 105 received the notification of the abnormal state for the focusing actuator from the DSP 501 in Step S83, the CPU 105 changes the setting of the gain changing circuit 108 so as to make the loop gain of the focusing control system smaller in such a manner that the focusing driving integration value (Fdsum) does not exceed the abnormal state detection level (Fdlvl) in Step S85. On the other hand, when the CPU 105 received the notification of the abnormal state for the tracking actuator from the DSP 501 in Step S84, the CPU 105 changes the setting of the gain changing circuit 304 so as to make the loop gain of the tracking control system smaller in such a manner that the tracking driving integration value (Tdsum) does not exceed the abnormal state detection level (Tdlvl) in Step S86. Thus, the power supplied to the focusing/tracking actuator can be reduced, thereby the actuator can be protected.

Moreover, also in the present embodiment, when both the rotation speed of the optical disk and the loop gain of the focusing/tracking control system are lowered at the same time, the power supplied to the actuator can be effectively reduced while the focusing/tracking servo is kept in the appropriate state, as in the first embodiment. Such an operation can be performed by changing the operation mode of the optical disk apparatus.

As described above, according to the present embodiment, the signal corresponding to the driving signal for the focusing/tracking actuator is subjected to the magnitude integration over a predetermined time period, and based on the integration result the abnormal driving state of the focusing/tracking actuator can be detected. When the abnormal state is detected, the magnitude of the signal for driving the focusing/tracking actuator is made smaller by lowering the rotation speed of the optical disk or the loop gain of either one of the focusing control system and the tracking control system that corresponds to the actuator in the abnormal driving state, thereby the power supplied to the actuator in the abnormal driving state can be controlled. Thus, the actuator can be protected appropriately against the AC component of the large driving current occurring when the reproduction/recording operation is performed for the optical disk with waiver rotating at the higher speed or the optical disk eccentrically rotating at the higher speed. Moreover, the stable reproduction/recording operation can be realized.

In addition, in the case where the maximum rating power of the actuator is defined by the sum of the power supplied to the focusing actuator and that supplied to the tracking actuator, the abnormal state detection level for the focusing actuator (Fdlvl) may be changed in accordance with the operation state of the tracking control system, as described in the first embodiment. This enables more appropriate protection of the focusing actuator.

Embodiment 6

Figure 15:
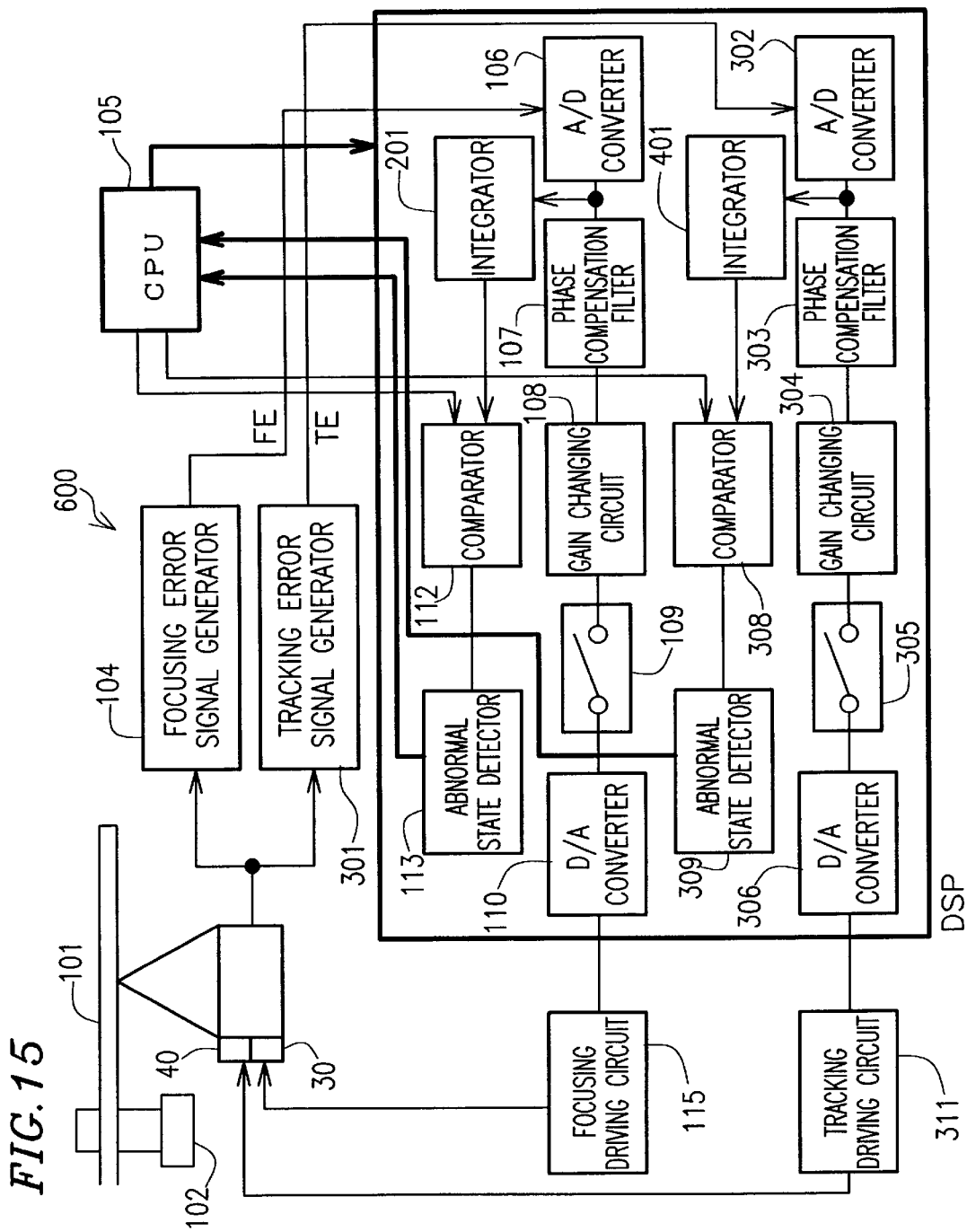
FIG. 15 is a block diagram illustrating a structure of an optical disk apparatus according to the sixth embodiment of the present invention.

FIG. 15 is a block diagram schematically showing the structure of an optical disk apparatus 600 according to the sixth embodiment of the present invention. The optical disk apparatus 600 is realized by combining the structure of the optical disk apparatus 200 of the second embodiment (see FIG. 7) and that of the optical disk apparatus 400 (see FIG. 11). The same components as those described in the second and fourth embodiments are labeled with the same reference numerals and the detailed description thereof is omitted in the present invention.

In the focusing control system, the FE signal that passed through the A/D converter 106 is input to the integrator 201. The integrator 201 integrates the magnitude of the FE signal over a predetermined time period and outputs the integration result to the comparator 112. The comparator 112 compares the integration result from the integrator 201 with the abnormal state detection level (Felvl) set by the CPU 105. When the integration result exceeds the abnormal state detection level (Felvl), the driving of the focusing actuator is determined to be in the abnormal state. Thus, the abnormal state detector 113 sends the CPU 105 the signal indicating that the driving of the focusing actuator is in the abnormal state.

In the tracking control system, the TE signal that passed through the A/D converter 302 is input to the integrator 401. The integrator 401 integrates the magnitude of the TE signal over a predetermined time period and outputs the integration result to the comparator 308. The comparator 308 compares the integration result from the integrator 401 with the abnormal state detection level (Telvl) set by the CPU 105. When the integration result exceeds the abnormal state detection level (Telvl), the driving of the tracking actuator is determined to be in the abnormal state. Thus, the abnormal state detector 309 sends the CPU 105 the signal indicating that the driving of the tracking actuator is in the abnormal state.

The process of detecting the abnormal driving state and the process following the detection process in the present embodiment are the same as those in the fifth embodiment except that the signal corresponding to the FE/TE signal is used for the detection of the abnormal state, instead of the signal corresponding to the driving signal for the focusing/tracking actuator. Therefore, the detailed description of the processes is omitted in the present embodiment.

According to the present embodiment, the signal corresponding to the FE/TE signal is subjected to the magnitude integration over a predetermined time period, and based on the integration result the abnormal driving state of the focusing/tracking actuator is detected. In the case where the abnormal state is detected, the magnitude of the driving signal for the focusing/tracking actuator is reduced by lowering the rotation speed of the optical disk and/or lowering the loop gain of either one of the focusing control system and the tracking control system that corresponds to the actuator driven abnormally, thereby controlling the power supplied to the actuator. Therefore, the actuator can be protected appropriately against the AC component of the large driving current occurring when the reproduction/recording operation is performed for the optical disk with waiver rotating at the higher speed or the optical disk eccentrically rotating at the higher speed. In addition, the stable reproduction/recording operation can be performed.

Moreover, as in the fifth embodiment, when the abnormal state detection level for the focusing actuator (Felvl) is changed between the state where the tracking control is on, such as the state of the normal reproduction, and the state where the tracking control is off, such as the state where the search operation is performed, the focusing actuator can be protected more appropriately.

In the above description, the embodiments in which the integration of the magnitude of the focusing/tracking control signal and the detection of the abnormal driving state of the actuator based on the integration result are performed using the DSP in accordance with the program are described as the first through sixth embodiments. However, the configuration of the optical disk apparatus of the present invention is not limited thereto. The optical disk apparatus of the present invention may include an analog circuit having the configuration allowing the integration of the magnitude of the focusing/tracking control signal and the detection of the abnormal driving state of the actuator based on the integration result, without using the DSP. Moreover, as the signal process conducted in the DSP, various types of signal processes can be applied as long as they can integrate the magnitude of the focusing/tracking control signal and then detect the abnormal driving state of the actuator based on the integration result.

As described above, according to the present invention, when the focusing control is performed, the magnitude of the focusing control signal for controlling the converging point of the light beam (the driving signal for the focusing actuator, the focusing error signal, or the signal corresponding to these signals) is integrated over a predetermined time period. Then, the abnormal driving state of the focusing actuator is detected based on the magnitude integration. When the abnormal driving state is detected, the signal for driving the focusing actuator (the driving current) is reduced by lowering the rotation speed of the optical disk and/or lowering the loop gain of the focusing control system. Therefore, the stable reproduction/recording operation can be performed while the focusing actuator is protected appropriately.

Also, when the tracking control is performed, the magnitude of the tracking control signal for controlling a positional relationship between the converging point of the light beam and the target track (the driving signal for the tracking actuator, the tracking error signal, or the signal corresponding to these signals) is integrated over a predetermined time period. Then, the abnormal driving state of the tracking actuator is detected based on the magnitude integration. When the abnormal driving state is detected, the signal for driving the tracking actuator (the driving current) is reduced by lowering the rotation speed of the optical disk or and/or lowering the loop gain of the tracking control system. Therefore, the stable reproduction/recording operation can be performed while the tracking actuator is protected appropriately.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An optical disk apparatus comprising:
   a light irradiator operable to converge a light beam and irradiate an information carrier with the converged light beam;
   a moving means operable to move a converging point of the light beam in a direction substantially perpendicular to a surface of the information carrier; and
   a focusing controller operable to control the moving means to place the converging point of the light beam at a predetermined position, wherein the focusing controller includes:
      a converging state detector operable to generate a detection signal corresponding to a converging state of the light beam on the information carrier;
      a focusing driving means operable to generate a driving signal for driving the moving means based on the detection signal;
      an integrator operable to integrate an absolute value of a signal corresponding to the driving signal over a predetermined time period; and
      an abnormal state detector operable to detect an abnormal state of the moving means based on an output of the integrator, the abnormal state being caused by a disturbance due to a higher degree component of waver of the optical disk.

2. An optical disk apparatus comprising:
   a light irradiator operable to converge a light beam and irradiate an information carrier with the converged light beam;
   a moving means operable to move a converging point of the light beam in a direction substantially perpendicular to a surface of the information carrier; and
   a focusing controller operable to control the moving means to place the converging point of the light beam at a predetermined position, wherein the focusing controller includes:
      a converging state detector operable to generate a detection signal corresponding to a converging state of the light beam on the information carrier;
      a focusing driving means operable to generate a driving signal for driving the moving means based on the detection signal;
      an integrator operable to integrate an absolute value of a signal corresponding to the detection signal over a predetermined time period; and
      an abnormal state detector operable to detect an abnormal state of the moving means based on an output of the integrator, the abnormal state being caused by a disturbance due to a higher degree component of waver of the optical disk.

3. An optical disk apparatus according to claim 1, wherein the driving signal is decreased to prevent the moving means from being damaged when the abnormal state detector detects the abnormal state of the moving means.

4. An optical disk apparatus according to claim 3, wherein a loop gain of the focusing controller is decreased when the abnormal state detector detects the abnormal state of the moving means.

5. An optical disk apparatus comprising:
   a light irradiator operable to converge a light beam and irradiate an information carrier with the converged light beam;
   a moving means operable to move a converging point of the light beam in a direction substantially perpendicular to a surface of the information carrier; and
   a focusing controller operable to control the moving means to place the converging point of the light beam at a predetermined position, wherein the focusing controller includes:
      a converging state detector operable to generate a detection signal corresponding to a converging state of the light beam on the information carrier;
      a focusing driving means operable to generate a driving signal for driving the moving means based on the detection signal;
      an integrator operable to integrate an absolute value of a signal corresponding to the driving signal over a predetermined time period; and
      an abnormal state detector operable to detect an abnormal state of the moving means based on an output of the integrator, wherein the driving signal is decreased to prevent the moving means from being damaged when the abnormal state detector detects the abnormal state of the moving means and, wherein a rotation speed of the information carrier is lowered when the abnormal state detector detects the abnormal state of the moving means.

6. An optical disk apparatus comprising:
   a light irradiator operable to converge a light beam and irradiate an information carrier with the converged light beam;
   a moving means operable to move a converging point of the light beam in a direction substantially perpendicular to a surface of the information carrier; and
   a focusing controller operable to control the moving means to place the converging point of the light beam at a predetermined position, wherein the focusing controller includes:
      a converging state detector operable to generate a detection signal corresponding to a converging state of the light beam on the information carrier;
      a focusing driving means operable to generate a driving signal for driving the moving means based on the detection signal;
      an integrator operable to integrate an absolute value of a signal corresponding to the driving signal over a predetermined time period; and
      an abnormal state detector operable to detect an abnormal state of the moving means based on an output of the integrator, said optical disk apparatus, further comprising:
   a second moving means operable to move the light beam in a direction traversing a track formed on the surface of the information carrier;
   a deviation detector operable to generate a signal corresponding to a positional relationship between the light beam and the track; and
   a tracking controller operable to control the light beam to scan on the track by driving the second moving means in response to the signal generated by the deviation detector, wherein the abnormal state detector changes a detection threshold value used for detection of the abnormal state in accordance with operation modes of the tracking controller.

7. An optical disk apparatus comprising:
   a light irradiator operable to converge a light beam and irradiate an information carrier with the converged light beam; and
   a moving means operable to move a converging point of the light beam in a direction substantially perpendicular to a surface of the information carrier,
   wherein an absolute value of a focusing control signal is integrated over a predetermined time period, the focusing control signal being used for controlling a movement of the moving means to place the converging point of the light beam at a predetermined position, and
   wherein a driving signal for driving the moving means is adjusted so as to reduce a disturbance due to a higher degree component of waver of the optical disk based on a result of the integration.

8. An optical disk apparatus according to claim 2, wherein the driving signal is decreased to prevent the moving means from being damaged when the abnormal state detector detects the abnormal state of the moving means.

9. An optical disk apparatus according to claim 8, wherein a loop gain of the focusing controller is decreased when the abnormal state detector detects the abnormal state of the moving means.

10. An optical disk apparatus comprising:
    a light irradiator operable to converge a light beam and irradiate an information carrier with the converged light beam;
    a moving means operable to move a converging point of the light beam in a direction substantially perpendicular to a surface of the information carrier; and
    a focusing controller operable to control the moving means to place the converging point of the light beam at a predetermined position, wherein the focusing controller includes:
       a converging state detector operable to generate a detection signal corresponding to a converging state of the light beam on the information carrier;
       a focusing driving means operable to generate a driving signal for driving the moving means based on the detection signal;
       an integrator operable to integrate an absolute value of a signal corresponding to the detection signal over a predetermined time period; and
       an abnormal state detector operable to detect an abnormal state of the moving means based on an output of the integrator, wherein the driving signal is decreased to prevent the moving means from being damaged when the abnormal state detector detects the abnormal state of the moving means and, wherein a rotation speed of the information carrier is lowered when the abnormal state detector detects the abnormal state of the moving means.

11. An optical disk apparatus comprising:
    a light irradiator operable to converge a light beam and irradiate an information carrier with the converged light beam;
    a moving means operable to move a converging point of the light beam in a direction substantially perpendicular to a surface of the information carrier; and
    a focusing controller operable to control the moving means to place the converging point of the light beam at a predetermined position, wherein the focusing controller includes:
a converging state detector operable to generate a detection signal corresponding to a converging state of the light beam on the information carrier;
a focusing driving means operable to generate a driving signal for driving the moving means based on the detection signal;
an integrator operable to integrate an absolute value of a signal corresponding to the detection signal over a predetermined time period; and an abnormal state detector operable to detect an abnormal state of the moving means based on an output of the integrator, said optical disk apparatus,
further comprising:
a second moving means operable to move the light beam in a direction traversing a track formed on a surface of the information carrier;
a deviation detector operable to generate a signal corresponding to a positional relationship between the light beam and the track; and
a tracking controller operable to control the light beam to scan on the track by driving the second moving means in response to the signal generated by the deviation detector, wherein the abnormal state detector changes a detection threshold value used for detection of the abnormal state in accordance with operation modes of the tracking controller.

12. An optical disk apparatus according to claim 1, wherein the predetermined time period is equal to or longer than a period of the rotation of the optical disk and is equal to or shorter than a rating time defining a maximum rating power of the moving means.

13. An optical disk apparatus according to claim 2, wherein the predetermined time period is equal to or longer than a period of the rotation of the optical disk and is equal to or shorter than a rating time defining a maximum rating power of the moving means.

14. An optical disk apparatus according to claim 7, wherein the predetermined time period is equal to or longer than a period of the rotation of the optical disk and is equal to or shorter than a rating time defining a maximum rating power of the moving means.

* * * * *